(12) United States Patent
Tahon et al.

(10) Patent No.: US 7,223,357 B2
(45) Date of Patent: May 29, 2007

(54) COMPOSITION CONTAINING A POLYMER OR COPOLYMER OF A 3,4-DIALKOXYTHIOPHENE AND NON-AQUEOUS SOLVENT

(75) Inventors: Jean-Pierre Tahon, Langdorp (BE); Roger Van den Bogaert, Schoten (BE); Bert Groenendaal, Sinaai (BE); Frank Louwet, Diepenbeek (BE)

(73) Assignee: AGFA-Gevaert, Mortsel (BE)

( * ) Notice: Subject to any disclaimer, the term of this patent is extended or adjusted under 35 U.S.C. 154(b) by 0 days.

(21) Appl. No.: 11/180,051

(22) Filed: Jul. 12, 2005

(65) Prior Publication Data

US 2006/0027791 A1 Feb. 9, 2006

Related U.S. Application Data

(60) Division of application No. 10/894,441, filed on Jul. 19, 2004, which is a continuation-in-part of application No. 10/309,879, filed on Dec. 4, 2002, now abandoned.

(60) Provisional application No. 60/382,577, filed on May 22, 2002, provisional application No. 60/350,453, filed on Jan. 22, 2002, provisional application No. 60/349,573, filed on Jan. 18, 2002.

(30) Foreign Application Priority Data

| Dec. 4, 2001 | (EP) | ................... | 01000698 |
| Dec. 20, 2001 | (EP) | ................... | 01000780 |
| May 16, 2002 | (EP) | ................... | 02100500 |

(51) Int. Cl.
*H01B 1/12* (2006.01)

(52) U.S. Cl. ............... 252/500; 528/373; 528/377

(58) Field of Classification Search ............ 252/500; 528/373, 377; 427/96
See application file for complete search history.

(56) References Cited

U.S. PATENT DOCUMENTS

| 5,443,944 | A | 8/1995 | Krafft et al. |
| 5,494,609 | A | 2/1996 | Kulkarni et al. |
| 6,084,040 | A | 7/2000 | Jonas et al. |
| 6,358,437 | B1 | 3/2002 | Jonas et al. |
| 6,692,662 | B2 * | 2/2004 | Haghighat et al. .......... 252/500 |
| 7,008,562 | B2 * | 3/2006 | Jonas et al. ................ 252/500 |
| 2002/0016440 | A1 * | 2/2002 | Louwet et al. ............. 528/373 |
| 2002/0173579 | A1 | 11/2002 | Jonas et al. |
| 2003/0211331 | A1 * | 11/2003 | Louwet et al. ............. 428/419 |
| 2004/0051084 | A1 | 3/2004 | Wessling et al. |

FOREIGN PATENT DOCUMENTS

| DE | 42 11 459 A1 | 10/1993 |
| EP | 0 440 957 A2 | 8/1991 |
| EP | 0 686 662 A2 | 12/1995 |
| EP | 1 010 733 A2 | 6/2000 |
| EP | 1 081 546 A1 | 3/2001 |
| EP | 1 081 548 A1 | 3/2001 |
| EP | 1 081 549 A1 | 3/2001 |
| JP | 59-210947 A | 11/1984 |
| WO | WO 99/34371 A1 | 7/1999 |
| WO | WO 00/16595 A1 | 3/2000 |
| WO | WO 02/00759 A1 | 1/2002 |
| WO | WO 02/42352 A2 | 5/2002 |
| WO | WO 02/067273 A1 | 8/2002 |
| WO | WO 02/072660 A1 | 9/2002 |
| WO | WO 02/072714 A1 | 9/2002 |

* cited by examiner

*Primary Examiner*—Mark Kopec
(74) *Attorney, Agent, or Firm*—Leydig, Voit & Mayer, Ltd.

(57) ABSTRACT

A method for preparing a composition containing between 0.08 and 3.0% by weight of polymer or copolymer of a 3,4-dialkoxythiophene in which the two alkoxy groups may be the same or different or together represent an optionally substituted oxy-alkylene-oxy bridge, a polyanion and at least one non-aqueous solvent from a dispersion of the polymer or copolymer of (3,4-dialkoxythiophene) and the polyanion in water which is prepared in the substantial absence of oxygen, comprising in the following order the steps of: i) mixing at least one of the non-aqueous solvents with the aqueous dispersion of the polymer or copolymer of (3,4-dialkoxythiophene) and the polyanion; and ii) evaporating water from the mixture prepared in step i) until the content of water therein is reduced by at least 65% by weight; a printing ink, printing paste or coating composition, capable of yielding layers with enhanced conductivity at a given transparency, prepared according to the above-described method; a coating process with the coating composition thereby producing a layer with enhanced conductivity at a given transparency; and a printing process with the printing ink or paste thereby producing a layer with enhanced conductivity at a given transparency.

17 Claims, No Drawings

COMPOSITION CONTAINING A POLYMER OR COPOLYMER OF A 3,4-DIALKOXYTHIOPHENE AND NON-AQUEOUS SOLVENT

CROSS-REFERENCE TO RELATED APPLICATIONS

This application is a Division of Ser.No. 10/894,441 (filed Jul. 19, 2004 now allowed), which application is a CIP of Ser. No. 10/309,879 (filed Dec. 4, 2002, now abandoned), which claimed the benefit of U.S. Provisional Application No. 60/349,573 filed Jan. 18, 2002, U.S. Provisional Application No. 60/350,453 filed Jan. 22, 2002 and U.S. Provisions Application No. 60/382,577 filed May 22, 2002, all of which are incorporated by reference.

FIELD OF THE INVENTION

The present invention relates to method of preparing a composition containing a polymer or copolymer of a 3,4-dialkoxythiophene and non-aqueous solvent.

BACKGROUND OF THE INVENTION

U.S. Pat. No. 5,494,609 discloses an electrically conductive coating composition comprising: a dispersion comprising dispersed particle of an intrinsically conductive polymer and, a solution which comprises a hydrophobic film-forming thermoplastic polymer, a highly polar plasticizer, and, an acid anhydride surfactant, in an organic solvent; wherein said thermoplastic polymer is soluble in said solvent to at least 1 percent by weight; and, wherein said dispersion comprises from about 1 to about 50 percent by weight of said intrinsically conductive polymer.

EP-A 440 957 discloses dispersions of polythiophenes, constructed from structural units of formula (I):

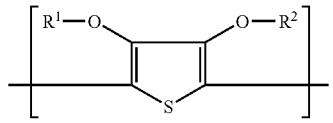

in which $R^1$ and $R^2$ independently of one another represent hydrogen or a $C_{1-4}$-alkyl group or together form an optionally substituted $C_{1-4}$-alkylene residue, in the presence of polyanions.

EP-A-686 662 discloses mixtures of A) neutral polythiophenes with the repeating structural unit of formula (I),

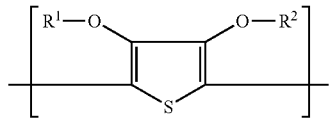

in which $R^1$ and $R^2$ independently of one another represent hydrogen or a $C_{1-4}$-alkyl group or together represent an optionally substituted $C_{1-4}$-alkylene residue, preferably an optionally with alkyl group substituted methylene, an optionally with $C_{1-12}$-alkyl or phenyl group substituted 1,2-ethylene residue or a 1,2-cyclohexene residue, and B) a di- or polyhydroxy- and/or carboxy groups or amide or lactam group containing organic compound; and conductive coatings therefrom which are tempered to increase their resistance preferably to <300 ohm/square.

WO 99/34371 discloses a screen paste with a viscosity of 1 to 200 dpa·s ($10^2$ to $2\times10^4$ mpa·s) containing a solution or dispersion of a conductive polymer paste and optionally binders, thickeners and fillers. WO 99/34371 further discloses a process for preparing screen pastes in which a solution or dispersion with a content of <2% by weight of poly(3,4-ethylenedioxythiophene) [PEDOT]/poly(styrene sulphonate) [PSS] is concentrated to a solids content of >2% by weight by removing the solvent and in which subsequently binder and/or filler are optionally added. Example 1 discloses evaporation of water from a 1.3% by weight solids dispersion of PEDOT/PSS in water to a 3% by weight solids dispersion in a rotary evaporator at 45° C. and 20 hPa (mbar).

EP-A 1 081 549 discloses a coating composition comprising a solution of a substituted or unsubstituted thiophene-containing electrically-conductive polymer, a film-forming binder, and an organic solvent media; the media having a water content of less than 37 weight percent. Coating dispersions with 0.1% by weight of PEDOT/PSS, i.e. 0.0294% by weight of PEDOT since BAYTRON® P contains a weight ratio PEDOT to PSS of 1:2.4, and with between 8 and 25% by weight of water were disclosed in the invention examples using BAYTRON® P, a 1.22% by weight dispersion of PEDOT/PSS in water, as the starting material.

EP-A 1 081 546 discloses a coating composition comprising a solution of an electrically-conductive polymer and an organic solvent media wherein the solvents are selected from the group consisting of alcohols, ketones, cycloalkanes, arenes, esters, glycol ethers and their mixtures; the media having a water content of less than 12 weight percent. Coating dispersions with PEDOT/PSS concentrations between 0.02 and 0.1% by weight, i.e. between 0.00588 and 0.0294% by weight of PEDOT since BAYTRON® P contains a weight ratio PEDOT to PSS of 1:2.4, and with between 2 and 8% by weight of water were disclosed in the invention examples using BAYTRON® P, a 1.22% by weight dispersion of PEDOT/PSS in water, as the starting material.

EP-A 1 081 548 discloses a coating composition comprising a substituted or unsubstituted thiophene-containing electrically-conductive polymer and an organic solvent media; the media having a water content of less than 12 weight percent. Coating dispersions with PEDOT/PSS concentrations between 0.02 and 0.1% by weight, i.e. between 0.00588 and 0.0294% by weight of PEDOT since BAYTRON® P contains a weight ratio PEDOT to PSS of 1:2.4, and with between 2 and 8% by weight of water were disclosed in the invention examples using BAYTRON® P, a 1.22% by weight dispersion of PEDOT/PSS in water, as the starting material.

WO 02/042352 discloses a process for producing a water-dispersible powder essentially consisting of polymer particles T with repeating thiophene units and at least one further polyanionic polymer P characterized in that a dispersion or solution containing said polymer T is mixed with a compound which forms an azeotrope with water, the water is removed by azeotropic distillation and the polymer obtained isolated and dried.

WO 02/067273 discloses a method for exchanging solvent in a mixture comprising water and an optionally substituted polythiophene, the method comprising: a) heating at least one solvent in a vessel under conditions suitable for vaporizing water; b) contacting the heated solvent with the mixture comprising water and optionally substituted polythiophene, the contact being sufficient to remove at least part of the water from the mixture as vapor; and c) exchanging the water removed from the mixture with the solvent.

WO 02/072660 discloses a process for the preparation of dispersions or solutions, containing optionally substituted polythiophenes in organic solvents, characterized in that: a) a with water-miscible organic solvent or a with water-miscible organic solvent mixture is added to an aqueous dispersion or solution containing optionally substituted polythiophenes and b) the water is at least in part removed from the resulting mixtures.

WO 02/072714 discloses solutions and/or dispersions of organic semiconductors in a solvent mixture of at least two different organic solvents, characterized in that (A) each of the solvents on its own exhibits a boiling point below 200° C. and a melting point less than or equal to 15° C., (B) at least one of the solvents exhibits a boiling point between 140° C. and 200° C., (C) the solvents used do not contain benzylic $CH_2$- or CH-groups, (D) the solvents used are not benzene derivatives, which contain tertiary butyl substituents or more than two methyl substituents.

For many applications it is desirable that the coating medium of the conductive polymer dispersion be largely non-aqueous to aid surface wettability and reduce the energy requirements for drying. However, to avoid excessive dilution of the conductive polymer, large coating thicknesses and excessive use of solvent, the concentration of conductive polymer should be as high as possible. This can be realized by diluting aqueous dispersions with organic solvents, but this results in extreme dilution of the conductive polymer to 0.00588 to 0.0294% by weight, as disclosed in EP-A 1 081 546, EP-A 1 081 548 and EP-A 1 081 549.

ASPECTS OF THE INVENTION

It is therefore an aspect of the present invention to provide a method of preparing a composition containing concentrations of conductive polymers of at least 0.08% by weight in a largely non-aqueous medium or an aqueous medium with a solvent concentration of at least 30 percent by weight.

It is a further aspect of the present invention to provide a coating composition containing concentrations of conductive polymers of at least 0.08% by weight in a largely non-aqueous medium or an aqueous medium with a solvent concentration of at least 30 percent by weight.

It is also an aspect of the present invention to provide a coating process for coating a composition containing concentrations of conductive polymers of at least 0.08% by weight in a largely non-aqueous medium or an aqueous medium with a solvent concentration of at least 30 percent by weight.

It is also an aspect of the present invention to provide a printing ink or paste containing concentrations of conductive polymers of at least 0.08% by weight in a largely non-aqueous medium or an aqueous medium with a solvent concentration of at least 30 percent by weight.

It is also an aspect of the present invention to provide a printing process for printing a printing ink or paste containing concentrations of conductive polymers of at least 0.08% by weight in a largely non-aqueous medium or an aqueous medium with a solvent concentration of at least 30 percent by weight.

Further aspects and advantages of the invention will become apparent from the description hereinafter.

SUMMARY OF THE INVENTION

Evaporation of a 1.2% by weight PEDOT/PSS dispersion in water at 60° C. and a pressure of 50 hPa (mbar) as disclosed in EXAMPLE 1 of WO 99/34371 only enables 60% of the water to be removed due to the increase in viscosity of the dispersion. Upon two-fold dilution of the resulting very viscous PEDOT/PSS mass, containing 96% by weight of water and 4% by weight of PEDOT/PSS, with a non-aqueous solvent, the resulting paste still contained 50 to 55% by weight of water. Further dilution of the PEDOT/PSS mass to 70 to 85% by weight of non-aqueous solvent produced an inhomogeneous dispersion with a reduced viscosity. Surprisingly it has been found that addition of the non-aqueous solvent to a 1.2% by weight PEDOT/PSS dispersion in water prior to evaporation of the water enabled more than 60% of the water to be removed and more than 99% water removal to be realized without colloidal destabilization of the PEDOT/PSS-latex.

Aspects of the present invention are realized by a method for preparing a composition containing between 0.08 and 3.0% by weight of polymer or copolymer of a 3,4-dialkoxythiophene in which the two alkoxy groups may be the same or different or together represent an optionally substituted oxy-alkylene-oxy bridge, a polyanion and at least one non-aqueous solvent from a dispersion of the polymer or copolymer of (3,4-dialkoxythiophene) and the polyanion in water which is prepared in the substantial absence of oxygen, comprising in the following order the steps of: i) mixing at least one of the non-aqueous solvents, with the aqueous dispersion of the polymer or copolymer of (3,4-dialkoxythiophene) and the polyanion; and ii) evaporating water from the mixture prepared in step i) until the content of water therein is reduced by at least 65% by weight.

Aspects of the present invention are also realized by a coating composition, capable of yielding layers with enhanced conductivity at a given transparency, prepared according to the above-described method.

Aspects of the present invention are also realized by a coating process comprising the steps of: providing the above-described coating composition; coating the coating composition on an optionally subbed support, a dielectric layer, a phosphor layer or a transparent conductive layer thereby producing a layer with enhanced conductivity at a given transparency.

Aspects of the present invention are also realized by a printing ink or paste, capable of yielding layers with enhanced conductivity at a given transparency, prepared according to the above-described method.

Aspects of the present invention are also realized by a printing process comprising the steps of: providing the above-described printing ink; printing the printing ink on an optionally subbed support, a dielectric layer, a phosphor layer or a transparent conductive layer thereby producing a layer with enhanced conductivity at a given transparency.

Preferred embodiments are disclosed in the dependent claims.

DETAILED DESCRIPTION OF THE INVENTION

Definitions

The term alkoxy means all variants possible for each number of carbon atoms in the alkoxy group i.e. for three carbon atoms: n-propyl and isopropyl; for four carbon atoms: n-butyl, isobutyl and tertiary-butyl; for five carbon atoms:. n-pentyl, 1,1-dimethyl-propyl, 2,2-dimethylpropyl and 2-methyl-butyl etc.

The term oxyalkylenealkoxy means two oxygen atoms linked by an alkylene group. An alkylene group is a substituted or unsubstituted hydrocarbon group e.g. a —$(CH_2)_n$— group where n is an integer between 1 and 5, which may be substituted with an alkoxy, aryloxy, alkyl, aryl, alkaryl, alkyloxyalkyl, alkyloxyalkaryl, alkyloxyaryl, hydroxy, carboxy, carboxyalkyl, carboxyamino, sulfo or alkylsulfo group.

The term derivatives as used in connection with a particular polymer refers to variants thereof substituted with alkyl, alkoxy, alkyloxyalkyl, carboxy, alkylsulfonato and carboxy ester groups.

The term "non-aqueous solvent" means one or more non-aqueous solvents as opposed to the term "a non-aqueous solvent" which means a single non-aqueous solvent.

The term "polyhydroxy non-aqueous solvent" means a non-aqueous solvent having at least two hydroxy groups.

The term azeotrope, otherwise known as azeotropic mixture, as used in the disclosing the present invention means a solution of two or more liquids, the composition of which does not change upon distillation.

The term solution as used in disclosing the present invention means a mixture of at least one solid in at least one solvent, which is liquid and in which the solids are molecularly dissolved i.e. the vast majority of the solid molecules are actually dissolved and are not present in the form of aggregates or nano- or micro-particles.

The term dispersion as used in disclosing the present invention means a mixture of at least one solid in at least one solvent, which is liquid and in which the solids are not molecularly dissolved i.e. the vast majority of the solid molecules are not dissolved, but are present in the form of aggregates or nano -or micro-particles.

The expression "in the substantial absence of oxygen" in connection with the preparation of a dispersion of a polymer or copolymer of a (3,4-dialkoxythiophene) and a polyanion in water means that from the addition of initiator to the completion of the polymerization the reaction medium contains substantially no oxygen and the polymerization reaction is carried out under an inert gas atmosphere.

The term improved in referring to aqueous dispersions of PEDOT/PSS refers to aqueous dispersions of PEDOT/PSS prepared according to the polymerization process disclosed in EP-A 0 440 957 except that the polymerization process is carried out in the substantial absence of oxygen.

The term "enhanced electrical conductivity at a given transparency" means that the electrical conductivity of a coating obtained with a composition derived from a dispersion of a polymer or copolymer of a (3,4-dialkoxythiophene) and a polyanion in water prepared in the substantial absence of oxygen is higher than with the same transparency obtained with a composition with the same ingredients in the same concentrations only differing in having been derived from a dispersion of a polymer or copolymer of a (3,4-dialkoxythiophene) and a polyanion in water prepared in the presence of a substantial concentration of oxygen.

The term transparent as used in disclosing the present invention means having the property of transmitting at least 70% of the incident light without diffusing it.

The term translucent as used in disclosing the present invention means allowing the passage of light, yet diffusing it so as not to render bodies lying beyond clearly visible.

The term flexible as used in disclosing the present invention means capable of following the curvature of a curved object such as a drum e.g. without being damaged.

PEDOT as used in the present disclosure represents poly(3,4-ethylenedioxythiophene).

PSS as used in the present disclosure represents poly (styrene sulphonic acid) or poly(styrene sulphonate).

PET as used in the present disclosure represents poly (ethylene terephthalate).

The term screen printing as used in the present disclosure includes all types of printing in which printing is carried out through a screen e.g. silk screen printing.

The term conventional in referring to aqueous dispersions of PEDOT/PSS refers to aqueous dispersions of PEDOT/PSS prepared according to the polymerization process disclosed in EP-A 0 440 957.

Method of Preparing a Composition Containing a Polymer or Copolymer of a (3,4-dialkoxythiophene) and Non-aqueous Solvent According to the present invention a method for preparing a composition containing between 0.08 and 3.0% by weight of polymer or copolymer of a 3,4-dialkoxythiophene in which the two alkoxy groups may be the same or different or together represent an optionally substituted oxy-alkylene-oxy bridge, a polyanion and at least one non-aqueous solvent from a dispersion of the polymer or copolymer of (3,4-dialkoxythiophene) and the polyanion in water which is prepared in the substantial absence of oxygen, comprising in the following order the steps of: i) mixing at least one of the non-aqueous solvents, with the aqueous dispersion of the polymer or copolymer of (3,4-dialkoxythiophene) and the polyanion; and ii) evaporating water from the mixture prepared in step i) until the content of water therein is reduced by at least 65% by weight.

It has been found that to minimize flocking of the polymer or copolymer of a 3,4-dialkoxythiophene in which the two alkoxy groups may be the same or different or together represent an optionally substituted oxy-alkylene-oxy bridge and polyanion, the evaporation to reduce the water content by at least 65% by weight is best carried out with regular homogenization either on-line in a continuous process or off-line in a discontinuous process. In this way high concentrations of polymer or copolymer of a 3,4-dialkoxythiophene in which the two alkoxy groups may be the same or different or together represent an optionally substituted oxy-alkylene-oxy bridge and polyanion can be realized without a prohibitive rise in viscosity due to flocking of the polymer/polyanion. Otherwise pronounced flocking is observed forming a highly viscous "skin" on the evaporating dispersion, which strongly reduces the evaporation rate of water. This can be regarded as phase separation, although water and the organic liquid may be perfectly miscible in the absence of the polymer or copolymer/polyanion. It is believed that a phase separation may take place during the evaporation into a water-deficient phase in which the polyanion chains are present in coils resulting in flocking and a water-rich phase in which the polyanion chains are extended.

According to a first embodiment of the method, according to the present invention, the method further comprises the step of homogenization of the dispersion prepared in step (i) at least once during step (ii).

According to a second embodiment of the method, according to the present invention, the method further comprises the step of homogenization of the dispersion prepared in step (i) at least twice during step (ii).

According to a third embodiment of the method, according to the present invention, the dispersion of the polymer or copolymer of (3,4-dialkoxythiophene) and the polyanion in water is produced under inert gas e.g. nitrogen, helium or argon.

According to a fourth embodiment of the method, according to the present invention, step i) further comprises mixing the non-aqueous solvent and the aqueous dispersion of the polymer or copolymer of (3,4-dialkoxythiophene) and the polyanion with an organic liquid which forms an azeotrope with water. This enables the water to be evaporated off more rapidly and is advantageously added once the water content has been substantially reduced to expedite the reduction of the residual water content. Ethanol, isopropanol, n-propanol, n-butanol, sec-butanol, methylisobutylketone, ethyl acetate and are all examples of organic liquids, which form binary azeotropes with water. n-Butanol, for example, enables water contents below 5% by weight to be easily achieved.

According to a fifth embodiment of the method, according to the present invention the ratio by weight of polymer or copolymer of (3,4-dialkoxythiophene) to polyanion in the dispersion is in the range of 1:2.0 to 1:6.0.

According to a sixth embodiment of the method, according to the present invention, the water in the mixture from step i) is reduced by at least 70% by weight.

According to a seventh embodiment of the method, according to the present invention, the water in the mixture from step i) is reduced by at least 80% by weight.

According to an eighth embodiment of the method, according to the present invention, the water in the mixture from step i) is reduced by at least 90% by weight.

According to a ninth embodiment of the method, according to the present invention, the water in the mixture from step i) is reduced by at least 95% by weight.

According to a tenth embodiment of the method, according to the present invention, the water in the mixture from step i) is reduced by at least 99% by weight.

According to an eleventh embodiment of the method, according to the present invention, at least 30% by weight of the composition is non-aqueous solvent.

According to a twelfth embodiment of the method, according to the present invention, at least 65% by weight of the composition is non-aqueous solvent.

According to a thirteenth embodiment of the method, according to the present invention, 80% by weight of composition is non-aqueous solvent.

According to a fourteenth embodiment of the method, according to the present invention, the composition contains between 0.15 and 2.5% by weight of polymer or copolymer of a 3,4-dialkoxythiophene.

According to a fifteenth embodiment of the method, according to the present invention, the composition contains between 0.2 and 1.6% by weight of polymer or copolymer of a 3,4-dialkoxythiophene.

According to a sixteenth embodiment of the method, according to the present invention, the composition contains between 0.2 and 0.8% by weight of polymer or copolymer of a 3,4-dialkoxythiophene.

According to a seventeenth embodiment of the method, according to the present invention, the composition contains between 0.2 and 0.4% by weight of polymer or copolymer of a 3,4-dialkoxythiophene.

A poly(3,4-ethylenedioxy thiophene)[PEDOT]/poly(styrene sulphonate)[PSS] dispersion prepared according to the process of EP 440 957 typically has a pH of about 1.9. The pH of the dispersion can be varied between 1.2 and 3.2 without adversely affecting the properties of compositions prepared according to the present invention.

In general the degree to which water can be removed in the process, according to the present invention, will depend upon the ability of the water to diffuse through the dispersion to the surface, which is dependent upon the viscosity of the PEDOT/PSS-dispersion under the evaporation conditions. However, the viscosity of PEDOT/PSS-dispersions is strongly dependent upon the PEDOT/PSS-content in the final dispersion. Water-contents of 1 to 5% by weight can be easily realized with dispersions of 0.8% by weight PEDOT/PSS with a weight ratio of PEDOT to PSS of 1:2.4, but just increasing the content of PEDOT/PSS, with a weight ratio of PEDOT to PSS of 1:2.4, to 1.0% by weight has such a strong influence on the viscosity of the dispersion that the easily realizable water-content increases to 10 to 15% by weight.

It is preferred that the temperature at which the distillation is carried out a temperature at or below 80° C., particularly preferably at or below 70° C. Distillation at a temperature of 88–89° C. has been found to yield a PEDOT/PSS-dispersion, which upon working up to a screen printing paste gives prints with a significantly higher surface resistance.

It should be pointed out that the viscoelastic properties of the PEDOT/PSS-dispersions obtained with the method, according to the present invention, are stable upon storage under ambient conditions.

Polymer or Copolymer of a 3,4-dialkoxythiophene

According to an eighteenth embodiment of the method, according to the present invention, the polymer or copolymer of a (3,4-dialkoxythiophene) has the formula

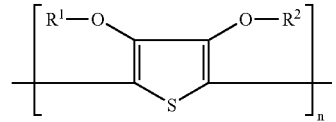

in which, each of $R^1$ and $R^2$ independently represents hydrogen or a $C_{1-5}$-alkyl group or together represent an optionally substituted $C_{1-5}$ alkylene group or a cycloalkylene group.

According to a nineteenth embodiment of the method, according to the present invention, the polymer or copolymer of a (3,4-dialkoxythiophene) is a polymer or copolymer of a (3,4-dialkoxythiophene) in which the two alkoxy groups together represent an optionally substituted oxy-alkylene-oxy bridge.

According to a twentieth embodiment of the method, according to the present invention, the polymers or copolymers of a (3,4-dialkoxy-thiophenes) are polymers or copolymers of a (3,4-dialkoxy-thiophenes) in which the two alkoxy groups together represent an optionally substituted oxy-alkylene-oxy bridge are selected from the group consisting of: poly(3,4-methylenedioxythiophene), poly(3,4-methylenedioxythiophene) derivatives, poly(3,4-ethylenedioxythiophene), poly(3,4-ethylenedioxythiophene) derivatives, poly(3,4-propylenedioxythiophene), poly(3,4-propylenedioxythiophene) derivatives, poly(3,4-butylenedioxythiophene) and poly(3,4-butylenedioxythiophene) derivatives and copolymers thereof.

According to a twenty-first embodiment of the method, according to the present invention, the polymers or copolymers of a (3,4-dialkoxythiophenes), the substituents for the oxy-alkylene-oxy bridge are alkyl, alkoxy, alkyloxyalkyl, carboxy, alkylsulphonato, alkyloxyalkylsulphonato and carboxy ester groups.

According to a twenty-second embodiment of the method, according to the present invention, in the poly(3,4-dialkoxythiophenes) the two alkoxy groups together represent an optionally substituted oxy-alkylene-oxy bridge which is a 1,2-ethylene group, an optionally alkyl-substituted methylene group, an optionally $C_{1-12}$-alkyl- or phenyl-substituted 1,2-ethylene group, a 1,3-propylene group or a 1,2-cyclohexylene group.

Such polymers are disclosed in Handbook of Oligo- and Polythiophenes Edited by D. Fichou, Wiley-VCH, Weinheim (1999); by L. Groenendaal et al. in Advanced Materials, volume 12, pages 481–494 (2000); L. J. Kloeppner et al. in Polymer Preprints, volume 40(2), page 792 (1999); P. Schottland et al. in Synthetic Metals, volume 101, pages 7–8 (1999); and D. M. Welsh et al. in Polymer Preprints, volume 38(2), page 320 (1997).

According to a twenty-third embodiment of the method, according to the present invention, the dispersion of a polymer or copolymer of a (3,4-dialkoxythiophene) and a polyanion in water is prepared with an initiator in a reaction medium in the presence of polyanions under oxidizing or reducing conditions under an inert atmosphere such that when said initiator is added less than 3 mg of oxygen per litre of the reaction medium is present in the reaction medium.

According to a twenty-fourth embodiment of the process, according to the present invention, the dispersion of a polymer or copolymer of a (3,4-dialkoxythiophene) and a polyanion in water is prepared with an initiator in a reaction medium in the presence of polyanions under oxidizing or reducing conditions under an inert atmosphere such that when said initiator is added less than 1.5 mg of oxygen per litre of the reaction medium is present in the reaction medium.

According to a twenty-fifth embodiment of the process, according to the present invention, the dispersion of a polymer or copolymer of a (3,4-dialkoxythiophene) and a polyanion is prepared with an initiator in the presence of polyanions under oxidizing or reducing conditions under an inert atmosphere such that when said initiator is added less than 0.5 mg of oxygen per litre of the reaction medium is present in the reaction medium.

The concentration of oxygen in the reaction medium can be regulated by any means e.g. freeze-thaw techniques, prolonged bubbling of an inert gas such as argon, nitrogen or helium through the reaction medium, consumption of oxygen in a sacrificial reaction under an inert gas blanket. The polymerization reaction can be carried out at room temperature i.e. ca. 25° C. and at atmospheric pressure.

Polyanion

According to a twenty-sixth embodiment of the method, according to the present invention, polyanions include the polyanions of polymeric carboxylic acids, e.g. polyacrylic acids, polymethacrylic acids, or polymaleic acids, and polysulphonic acids, e.g. poly(styrene sulphonic acid). These polycarboxylic acids and polysulphonic acids can also be copolymers of vinylcarboxylic acids and vinylsulphonic acids with other polymerizable monomers, e.g. acrylic acid esters, methacrylic acid esters and styrene.

According to a twenty-seventh embodiment of the method, according to the present invention, the polyanion is a polyanion of poly(styrenesulphonic acid) or of a copolymer of poly(styrene sulphonic acid) with styrene.

According to a twenty-eighth embodiment of the method, according to the present invention, the molar ratio of polymer or copolymer of a 3,4-dialkoxythiophene, in which the two alkoxy groups may be the same or different or together represent an optionally substituted oxy-alkylene-oxy bridge, to polyanion is in the range of 1:0.95 to 1:6.5.

According to a twenty-ninth embodiment of the method, according to the present invention, the molar ratio of polymer or copolymer of a 3,4-dialkoxythiophene, in which the two alkoxy groups may be the same or different or together represent an optionally substituted oxy-alkylene-oxy bridge, to polyanion is in the range of 1:0.95 to 1:3.0.

Non-aqueous Solvents

According to a thirtieth embodiment of the method, according to the present invention, the non-aqueous solvent is incapable of forming an azeotrope with water.

According to a thirty-first embodiment of the method, according to the present invention, the non-aqueous solvent is water-miscible.

According to a thirty-second embodiment of the method, according to the present invention, the non-aqueous solvent is selected from the group consisting of alcohols, ketones, arenes, esters, ethers, and their mixtures, e.g. glycol ethers or cyclic ethers such as tetrahydrofuran, with polyhydroxy non-aqueous solvents being particularly preferred. Other solvents can be used, but the sole use of a non-polyhydroxy non-aqueous solvent such as N-methyl-pyrrolidinone (NMP) or carbitol acetate was found to be disadvantageous as regards layer transparency for layers with a given surface resistance. Furthermore, the sole use of NMP also readily gave rise to lumps and flakes of PEDOT/PSS, which are not readily dispersible.

According to a thirty-third embodiment of the method, according to the present invention, the non-aqueous solvent comprises at least one polyhydroxy non-aqueous solvent, with the at least one polyhydroxy non-aqueous solvent preferably being exclusive of sugar alcohols and ethylene glycol and water miscible; and particularly preferably being selected from the group consisting of ethylene glycol, propylene glycol, propandiol, glycerol, diethylene glycol and triethylene glycol. Conductive coatings therefrom may be tempered to decrease their surface resistance preferably to <300 ohm/square as disclosed in EP-A 686 662, hereby incorporated by reference.

According to a thirty-fourth embodiment of the method, according to the present invention, the non-aqueous solvent comprises at least one polyhydroxy non-aqueous solvent and a non-aqueous solvent is added in a further process step for example alcohols, ketones, arenes, esters, ethers, and their mixtures.

According to a thirty-fifth embodiment of the method, according to the present invention, the non-aqueous solvent comprises at least one polyhydroxy non-aqueous solvent and a non-aqueous solvent is added in a further process step, the further added non-aqueous solvent being a di- or polyhydroxy- and/or carboxy groups or amide or lactam group containing organic compound for example sugar alcohols, such as sorbitol, mannitol, saccharose and fructose, diethylene glycol, 1,2-propandiol and propylene glycol. Conductive coatings therefrom are optionally tempered to decrease their surface resistance preferably to <300 ohm/square as disclosed in EP-A 686 662, hereby incorporated by reference.

According to a thirty-sixth embodiment of the method, according to the present invention, the non-aqueous solvent comprises at least one polyhydroxy non-aqueous solvent and a non-aqueous solvent is added in a further process step, the further added non-aqueous solvent being selected from the group consisting of 1,2-propandiol, propylene glycol, diethylene glycol, N,N-dimethylformamide, N-methylacetamide, glycerol, hexylene glycol and carbitol acetate. Conductive coatings therefrom may be tempered to decrease their surface resistance preferably to <300 ohm/square as disclosed in EP-A 686 662, hereby incorporated by reference.

The suitability of particular non-aqueous solvents can be evaluated by mixing 8 g of a 1.2% by weight aqueous dispersion of PEDOT/PSS with 12 g of solvent. If miscibility is observed without gel formation, the non-aqueous solvent is regarded as suitable. Tetrahydrofuran is miscible, but the dispersions are very viscous. Suitability according to the above miscibility test does not rule out phase separation upon further dilution of the PEDOT/PSS-dispersion with the same solvent, as is observed with tetrahydrofuran. It will be understood by one skilled in the art that a PEDOT/PSS-dispersion cannot be diluted to an unlimited extent without the possibility of phase separation.

Ethyl lactate is unsuitable in the absence of one or more further non-aqueous solvents, since it induces gel-formation. Benzyl alcohol, furfuryl alcohol and cyclohexane are also unsuitable in the absence of one or more further non-aqueous solvents, since they produce phase separation.

Binders

According to a thirty-seventh embodiment of the method, according to the present invention, a binder is added in a further process step. This binder binds together the ingredients of the antistatic or electroconductive layer produced with the composition according to the present invention such that a non-planar structure on a support can be better coated. This binder may also increase the viscosity of the composition produced according to the method of the present invention.

According to a thirty-eighth embodiment of the method, according to the present invention, a binder is added in a further process step, wherein the binder is a polyester urethane copolymer e.g. DISPERCOLL U VP KA 8481 from BAYER.

According to a thirty-ninth embodiment of the method, according to the present invention, a binder is added in a further process step, wherein the binder is selected from the group consisting polyacrylates, carboxymethylcellulose, polyvinylpyrrolidone, hydroxypropylcellulose, carboxylate-containing copolymers with sulfonic acid groups, hydroxy-modified acrylic acid copolymers and poly(vinyl alcohol).

The suitability of binders was assessed by adding 0.1% by weight of the particular binder to a typical dispersion medium for the PEDOT/PSS-containing compositions of the present invention such as 87% by weight of 1,2-propandiol, 9% by weight of diethylene glycol, 3% by weight of deionized water, 0.5% by weight of ZONYL® FSO and 0.5% by weight of silicone antifoam agent X50860A. A binder which dissolved in such a dispersion medium to the extent of 0.1% by weight was regarded as suitable for the compositions according to the present invention.

Particularly suitable binders are:

binder 01=CARBOPOL® ETD-2623, a homo- and copolymers of acrylic acid crosslinked with a polyalkenyl polyether, from B. F. Goodrich;

binder 02=CARBOPOL® Aqua 30, a latex of a copolymer of acrylic acid and ethyl acrylate from B. F. Goodrich;

binder 03=AMBERGUM® 3021, a carboxymethylcellulose from Hercules Inc.;

binder 04=LUVISKOL® K30, a polyvinyl pyrrolidone from BASF;

binder 05=a hydroxyalkyl cellulose methylpropylether from Shin-Etsu Chemical Company;

binder 06=KLUCEL® L, hydroxypropylcellulose from Hercules Inc.;

binder 07=NEOCRYL® BT24, an acrylate-based aqueous latex from Zenica;

binder 08=AQUACER® 503, an acrylate-based aqueous latex from BYC Cera;

binder 09=POLYPHOBE® TR117, an acrylate-based aqueous latex from Union Carbide;

binder 10=AMOREX® CR2900, an acrylate-based aqueous latex from Westvaco Corporation;

binder 11=CRX-8057-45, an acrylate-based aqueous latex from Westvaco Corporation;

binder 12=PRIMALT EP-5380, a 54% by weight acrylate-based aqueous latex from Rohm and Haas;

binder 13=JAGOTEX® KEM1020, a 58% by weight acrylate-based aqueous latex from Ernst Jager Chem. Rohstoffe GmbH;

binder 14=PERMUTEX® PS-34=320, a 54% by weight acrylate-based aqueous latex from Stahl Holland BV;

binder 15=JAGOTEX® KEM4009, a 55% by weight acrylate copolymer aqueous latex from Ernst Jager Chem. Rohstoffe GmbH;

binder 16=GOOD RITE® K797, a 50% by weight acrylic acid-AMPS copolymer aqueous latex from B. F. Goodrich;

binder 17=GOOD RITE® K-7058, a 50% by weight water-soluble acrylic acid polymer from B. F. Goodrich;

binder 18=NARLEX® DX2020, an acrylic acid/styrene copolymer latex from Alco Chemical;

binder 19=ALCOPERSE® 725, an acrylic acid/styrene copolymer latex from Alco Chemical;

binder 20=CARBOPOL® EP2, a 18.1% by weight non-crosslinked methacrylate acid/ethyl acrylate copolymer latex from B. F. Goodrich binder 21=97.5–99.5% hydrolyzed poly(vinyl alcohol) from WACKER CHEMIE.

binder 22=DISPERCOLL™ U VP KA 8481, a polyester urethane copolymer dispersion from BAYER Binders 1, 2 and 20 have a very strong influence upon the viscosity of the dispersion independent of the PEDOT/PSS-content.

Pigments and Dyes

According to a fortieth embodiment of the method, according to the present invention, a pigment or dye is added in a further process step to provide coloured or non-transparent compositions. Transparent coloured compositions can be realized by incorporating coloured dyes or pigments e.g. diazo and phthalocyanine pigments.

Non-transparent compositions can also be realized by incorporating a black pigment such as LEVANYL® A-SF from BAYER, LEVANYL® NLF from BAYER, KL1925, a carbon black dispersion from Degussa, and MHI Black 8102M, a carbon black dispersion from Mikuni, or titanium dioxide pigments in a weight sufficient to give non-transparency in the layer thickness being coated.

Suitable pigments are:
| Pigment nr. | Pigment | Manufacturer | |
|---|---|---|---|
| PIG01 | FLEXONYL ® Blue B2G | CLARIANT | 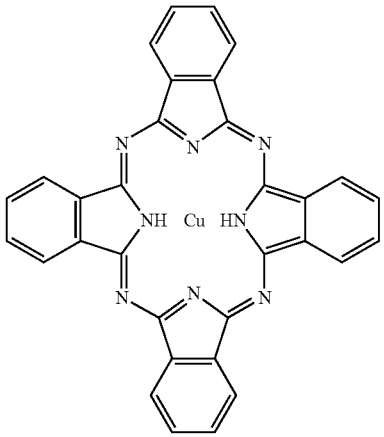 |
| PIG02 | LEVANYL ® Yellow HR-LF | BAYER | 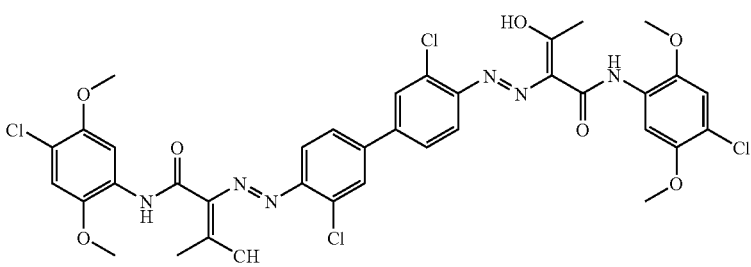 |
| PIG03 | NOVOPERM ® Yellow HR02 | CLARIANT | 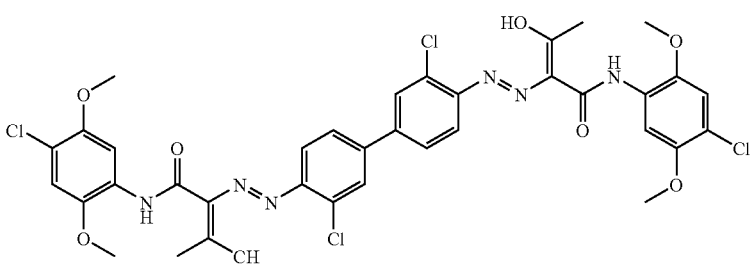 |
| PIG04 | LEVANYL ® Blue G-LF | BAYER | 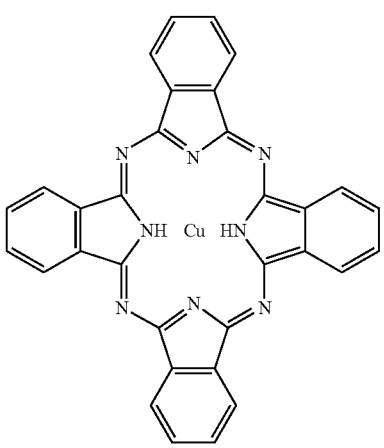 |

-continued

| Pigment nr. | Pigment | Manufacturer | |
|---|---|---|---|
| PIG05 | HOSTAPERM® Blue B2G | CLARIANT | (copper phthalocyanine structure) |
| PIG06 | HOSTAPERM® Blue B2G-L | CLARIANT | (copper phthalocyanine structure) |
| PIG07 | LEVANYL® N-LF | BAYER | a carbon black pigment dispersed in water |
| PIG0B | LEVANYL® A-SF | BAYER | a carbon black pigment dispersed in water |
| PIG09 | MHI 8102M | DEGUSSA | a carbon black pigment dispersed in water |
| PIG10 | GA Black 1 | Mikuni Color Ltd | a carbon black pigment dispersed in water |
| PIG11 | Bonjet Black CW-2 | Orient Chemicals Industries Ltd | a carbon black pigment dispersed in water |
| PIG12 | Bonjet Black CW-1 | Orient Chemicals Industries Ltd | a carbon black pigment dispersed in water |
| PIG13 | FX-GBI-015 | Nagase Nippon Shokubai | a carbon black pigment dispersed in 2-butanone (50–80%) + methylisobutylketone (8–20%) |
| PIG14 | LEVANYL® B-LF | BAYER | a carbon black pigment dispersed in water |
| PIG15 | TPX100 | CABOT CORP | a 20% dispersion of a modified carbon black in water |
| PIG16 | TPX100 | CABOT CORP | a 15% dispersion of a modified carbon black in water |

Crosslinking Agents

According to a forty-first embodiment of the method, according to the present invention, a cross-linking agent is added in a further process step. Suitable cross-linking agents are epoxysilane (e.g 3-glycidoxypropyltrimethoxysilane), hydrolysis products of silanes (e.g. hydrolysis products of tetraethyoxysilane or tetramethoxy-silane) as disclosed in EP 564 911, herein incorporated by reference, and di- or oligo-isocyanates optionally in blocked form.

Anti-foaming Agents

According to a forty-second embodiment of the method, according to the present invention, an anti-foaming agent is added.

A suitable anti-foaming agent is the silicone antifoam agent X50860A.

Surfactants

According to a forty-third embodiment of the method, according to the present invention, a surfactant is added.

According to a forty-fourth embodiment of the method, according to the present invention, an anionic surfactant is added.

According to a forty-fifth embodiment of the method, according to the method of the present invention a non-ionic surfactant is added e.g. ethoxylated/fluroralkyl surfactants, polyethoxylated silicone surfactants, polysiloxane/polyether surfactants, ammonium salts of perfluro-alkylcarboxylic acids, polyethoxylated surfactants and fluorine-containing surfactants.

Suitable non-ionic surfactants include:

Surfactant no. 01=ZONYL® FSN, a 40% by weight solution of $F(CF_2CF_2)_{1-9}CH_2CH_2O(CH_2CH_2O)_xH$ in a 50% by weight solution of isopropanol in water where x=0 to about 25, from DuPont;

Surfactant no. 02=ZONYL® FSN-100: $F(CF_2CF_2)_{1-9}CH_2CH_2O(CH_2CH_2O)_xH$ where x=0 to about 25, from DuPont;

Surfactant no. 03=ZONYL® FS300, a 40% by weight aqueous solution of a fluorinated surfactant, from DuPont;

Surfactant no. 04=ZONYL® FSO, a 50% by weight solution of a mixture of ethoxylated non-ionic fluoro-surfactant with the formula: $F(CF_2CF_2)_{1-7}CH_2CH_2O(CH_2CH_2O)_yH$ where y=0 to ca. 15 in a 50% by weight solution of ethylene glycol in water, from DuPont;

Surfactant no. 05=ZONYL® FSO-100, a mixture of ethoxylated non-ionic fluoro-surfactant from DuPont with the formula: $F(CF_2CF_2)_{1-7}CH_2CH_2O(CH_2CH_2O)_yH$ where y=0 to ca. 15 from DuPont;

Surfactant no. 06=Tegoglide® 410, a polysiloxane-polymer copolymer surfactant, from Goldschmidt;

Surfactant no. 07=Tegowet®, a polysiloxane-polyester copolymer surfactant, from Goldschmidt;

Surfactant no. 08=FLUORAD®FC431: $CF_3(CF_2)_7SO_2(C_2H_5)N-CH_2CO-(OCH_2CH_2)_nOH$ from 3M;

Surfactant no. 09=FLUORAD®FC126, a mixture of the ammonium salts of perfluorocarboxylic acids, from 3M;

Surfactant no. 10=Polyoxyethylene-10-lauryl ether

Surfactant no. 11=FLUORAD®FC430, a 98.5% active fluoroaliphatic ester from 3M;

Suitable anionic surfactants include:

Surfactant no. 12=ZONYL® 7950, a fluorinated surfactant, from DuPont;

Surfactant no. 13=ZONYL® FSA, 25% by weight solution of $F(CF_2CF_2)_{1-9}CH_2CH_2SCH_2CH_2COOLi$ in a 50% by weight solution of isopropanol in water, from DuPont;

Surfactant no. 14=ZONYL® FSE, a 14% by weight solution of $[F(CF_2CF_2)_{1-7}CH_2CH_2O]_xP(O)(ONH_4)_y$ where x=1 or 2; y=2 or 1; and x+y=3 in a 70% by weight solution of ethylene glycol in water, from DuPont;

Surfactant no. 15=ZONYL® FSJ, a 40% by weight solution of a blend of $F(CF_2CF_2)_{1-7}CH_2CH_2O]_xP(O)(ONH_4)_y$ where x=1 or 2; y=2 or 1; and x+y=3 with a hydrocarbon surfactant in 25% by weight solution of isopropanol in water, from DuPont;

Surfactant no. 16=ZONYL® FSP, a 35% by weight solution of $[F(CF_2CF_2)_{1-7}CH_2CH_2O]_xP(O)(ONH_4)_y$ where x=1 or 2; y=2 or 1 and x+y=3 in 69.2% by weight solution of isopropanol in water, from DuPont;

Surfactant no. 17=ZONYL® UR: $[F(CF_2CF_2)_{1-7}CH_2CH_2O]_xP(O)(OH)_y$ where x=1 or 2; y=2 or 1 and x+y=3, from DuPont;

Surfactant no. 18=ZONYL® TBS: a 33% by weight solution of $F(CF_2CF_2)_{3-8}CH_2CH_2SO_3H$ in a 4.5% by weight solution of acetic acid in water, from DuPont;

Surfactant no. 19=ammonium salt of perfluoro-octanoic acid;

Printing Ink or Paste

According to a first embodiment of the printing ink or paste according to the present invention, the printing ink or paste is a lithographic printing ink, a gravure printing ink, a flexographic printing ink, a screen printing ink, an ink-jet printing ink or an offset printing ink. The suitability of a composition, produced according to the method of the present invention, for a particular printing process is substantially determined by the viscosity of the composition.

Lithographic inks have a viscosity under printing conditions which varies from about 15 Pa.s to 35 Pa.s depending on the ink formulation, drying mechanism, printing machine and speed of printing.

Gravure and flexographic inks vary greatly, depending on whether one considers the viscosity of the inks in the can or the diluted inks on the printing press. In addition, dye-based inks tend to be of lower viscosity than pigmented inks, owing to pigment settling problems both in the can and on the printing press. As a general guide, a typical press-ink viscosity while being printed would be around 15 mpa·s.

Screen printing inks depend on the type of ink, screen mesh and printing speed. Typical viscosities of the diluted ink while being printed from the screen are between 0.5 and 5 Pa.s for rapid processing (shear rate=ca. $100\ s^{-1}$) and 8 to 40 Pa.s for slow processing (shear rate=ca. $1\ s^{-1}$) and 50 to 800 Pa.s at rest (shear rate=ca. $10^{-2}\ s^{-1}$).

Ink-jet inks have viscosities under printing conditions which vary from about 2 mpa·s to 20 mpa·s depending on the type of ink-jet process, nozzle construction, printing speed, ink-drying mechanism and print quality required.

Printing Process

Aspects of the present invention are realized by a printing process comprising the steps of: providing a printing ink or paste according to the present invention; printing the printing ink or paste on an optionally subbed support, a dielectric layer, a phosphor layer or a transparent conductive layer thereby producing a layer with enhanced conductivity at a given transparency.

Layers of the pastes exhibit excellent adhesion to phosphor layers, polyacrylate subbing layers, polycarbonate and polyesters e.g. poly(ethylene terephthalate) and surface resistances $\leq 1000$ Ω/square at visual light transmissions >75%, with $\geq 85\%$ being obtainable.

Among the electroluminescent phosphors to which the printing ink or paste can be applied are II–VI semiconductors e.g. ZnS, or are a combination of group II elements with oxidic anions, the most common being silicates, phosphates, carbonates, germanates, stannates, borates, vanadates, tungstates and oxysulphates. Typical dopants are metals and all the rare earths e.g. Cu, Ag, Mn, Eu, Sm, Tb and Ce. The electroluminescent phosphor may be encapsulated with a transparent barrier layer against moisture e.g. $Al_2O_3$ and AlN. Such phosphors are available from Sylvania, Shinetsu polymer KK, Durel, Acheson and Toshiba. An example of coatings with such phosphors is 72X, available from Sylvania/GTE, and coatings disclosed in U.S. Pat. No. 4,855,189. Suitable electroluminescent phosphors are ZnS doped with manganese, copper or terbium, $CaGa_2S_4$ doped with cerium, electroluminescent phosphor pastes supplied by DuPont e.g.: Luxprint® type 7138J, a white phosphor; Luxprint® type 7151J, a green-blue phosphor; and Luxprint® type 7174J, a yellow-green phosphor; and Electrodag® EL-035A supplied by Acheson. A particularly preferred electroluminescent phosphor is a zinc sulphide phosphor doped with manganese and encapsulated with AlN.

Any dielectric material may be used, with yttria and barium titanate being preferred e.g. the barium titanate paste Luxprint® type 7153E high K dielectric insulator supplied by DuPont and the barium titanate paste Electrodag® EL-040 supplied by Acheson.

According to a first embodiment of the printing process according to the present invention, the printing process is a process for producing an electroluminescent device comprising the steps of: (i) printing a transparent or translucent support with a printing ink or paste according to the present invention, to produce the transparent or translucent first conductive layer; (ii) printing the first conductive layer with a layer comprising an electroluminescent phosphor; (iii) optionally printing the layer comprising an electroluminescent phosphor with a dielectric layer; and (iv) printing the dielectric layer if present, or the layer comprising the electroluminescent phosphor if no dielectric layer is present, with a solution, dispersion or paste comprising a polymer or copolymer of a (3,4-dialkoxythiophene) to produce the second conductive layer, wherein the polymer or copolymer of the (3,4-dialkoxythiophene) in the solution, dispersion or paste used in step (i) may be the same or different from the polymer or copolymer of the (3,4-dialkoxythiophene) used in the solution, dispersion or paste used in step (iv).

According to a second embodiment of the printing process according to the present invention, the printing process is a process for producing an electroluminescent device comprising the steps of: (i) printing a support with a printing ink or paste according to the present invention to produce the second conductive layer; (ii) optionally printing the second conductive layer with a dielectric layer; (iii) printing the dielectric layer if present, or the second conductive layer if no dielectric layer is present, with a layer comprising an electroluminescent phosphor; and (iv) printing the electroluminescent phosphor layer with a transparent solution, dispersion or paste comprising a polymer or copolymer of a (3,4-dialkoxythiophene) to produce the transparent or translucent first conductive layer, wherein the polymer or copolymer of a (3,4-dialkoxythiophene) in the solution, dispersion or paste used in step (i) may be the same or different from the polymer or copolymer of a (3,4-dialkoxythiophene) in the transparent solution, dispersion or paste used in step (iv).

Coating Process

Aspects of the present invention are realized by a coating process comprising the steps of: providing a coating composition according to the above-described process; coating the coating composition on an optionally subbed support, a dielectric layer, a phosphor layer or a transparent conductive layer thereby producing a layer with enhanced conductivity at a given transparency.

Transparent or Translucent Support

According to a first embodiment of the coating process or third embodiment of the printing process, according to the present invention, the support is paper, polymer film, glass or ceramic.

According to a second embodiment of the coating process or a fourth embodiment of the printing process, according to the present invention, the support is a transparent or translucent polymer film.

A transparent or translucent support suitable for use in the electroluminescent device of the present invention may be rigid or flexible and consist of a glass, a glass-polymer laminate, a polymer laminate, a thermoplastic polymer or a duroplastic polymer. Examples of thin flexible supports are those made of a cellulose ester, cellulose triacetate, polypropylene, polycarbonate or polyester, with poly(ethylene terephthalate) or poly(ethylene naphthalene-1,4-dicarboxylate) being particularly preferred.

INDUSTRIAL APPLICATION

The coating composition according to the present invention can, for example, be used to apply antistatic or electroconductive coatings to an optionally subbed support, a dielectric layer, a phosphor layer or a transparent conductive layer.

The printing ink or paste according to the present invention can, for example, be used to apply antistatic or electroconductive patterns to an optionally subbed support, a dielectric layer, a phosphor layer or a transparent conductive layer. This can, for example, be a step in the production of electroluminescent devices which can be used in lamps, displays, back-lights e.g. LCD, automobile dashboard and keyswitch backlighting, emergency lighting, cellular phones, personal digital assistants, home electronics, indicator lamps and other applications in which light emission is required.

The invention is illustrated hereinafter by way of COMPARATIVE EXAMPLES and INVENTION EXAMPLES. The percentages and ratios given in these examples are by weight unless otherwise indicated.

The following supports were used in the COMPARATIVE and INVENTION EXAMPLES:

AUTOSTAT®=a 175 μm thick heat-stabilized poly(ethylene terephthalate) [PET] subbed on both sides supplied by AUTOTYPE INTERNATIONAL LTD;

100 μm thick heat-stabilized PET coated with subbing layer nr. 01;

100 μm thick heat-stabilized PET coated with subbing layer nr. 02;

100 μm thick heat-stabilized PET without a subbing layer;

MAKROFOL® DE 1-1 SC=a 125 μm polycarbonate film from BAYER AG;

BAYFOL® CR 1-4=a 115 μm thick extruded film of a blend of polycarbonate and poly(butylene terephthalate) from BAYER AG.

Subbing layer Nr. 01 has the composition:

| | |
|---|---|
| copolymer of 88% vinylidene chloride, 10% methyl acrylate and 2% itaconic acid | 79.1% |
| Kieselsol ® 100F, a colloidal silica from BAYER | 18.6% |
| Mersolat ® H, a surfactant from BAYER | 0.4% |
| Ultravon ® W, a surfactant from CIBA-GEIGY | 1.9% |

Subbing layer Nr. 02 has the composition:

| | |
|---|---|
| copolymer of 50 mol % ethylene glycol, 26.5 mol % terephthalic acid, 20 mol % isophthalic acid, 3.45 mol % sulfoisophthalic acid and 0.05 mol % of 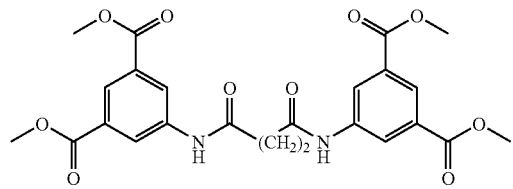 | 77.2% |
| copolymer of 20% ethyl acrylate and 80% methacrylic acid | 5.8% |
| Hordamer ® PE02, aqueous dispersion of polyethylene from HOECHST | 2.4% |
| PAREZ RESIN ® 707, a melamine-formaldehyde resin from AMERICAN CYANAMID | 14.6% |

The following layers were used in the COMPARATIVE and INVENTION EXAMPLES:
a layer of LUXPRINT™ 7153E (a high K dielectric insulator) screen printed through a P55 screen;
a layer of LUXPRINT™ 7138J (a white phosphor) screen printed through a P55 screen.

The following ingredients not mentioned above were used in the compositions of the COMPARATIVE and INVENTION EXAMPLES:
non-aqueous solvents:
  CA=carbitol acetate [di(ethyleneglycol) ethyl ether acetate]
  DEG=diethylene glycol
  NMP=N-methylpyrrolidinone
  PD=1,2-propandiol (propylene glycol)
  BUOH=n-butanol
X50860A=silicone antifoam agent X50860A from Shin-Etsu Dispersions of PEDOT/PSS Used in Preparing the PEDOT Pastes Described in the INVENTION AND COMPARATIVE EXAMPLES Conventional 1.2% by weight aqueous dispersion of PEDOT/PSS containing a weight ratio PEDOT to PSS of 1:2.4 used in INVENTION EXAMPLES 1 to 79 and the COMPARATIVE EXAMPLES:

In the pastes described in INVENTION EXAMPLES 1 to 79 a conventional 1.2% by weight aqueous dispersion of PEDOT/PSS containing a weight ratio PEDOT to PSS of 1:2.4 prepared as disclosed in EP-A 440 957, herein disclosed by reference, and having a typical viscosity measured using an AR1000 plate and cone rheometer (diameter 4 cm; cone angle 2°) at 20° C. of 38 mpa·s at a shear rate of 5 s$^{-1}$ decreasing to 33.5 mpa·s at a shear rate of 35 s$^{-1}$ and has a typical pH of 1.9.

Improved 1.2 wt% Aqueous Dispersion of PEDOT/PSS Containing a PEDOT to PSS Weight Ratio of 1:2.4 Used in INVENTION EXAMPLES 80 to 95:

In the pastes described in INVENTION EXAMPLES 80 to 95 the 1.2% by weight aqueous dispersion of PEDOT/PSS containing a weight ratio PEDOT to PSS of 1:2.4 used was prepared in the substantial absence of oxygen, which yielded prints having the same optical transparency but with substantially higher conductivity than those prepared by the above-described "conventional process".

This improved process was carried out as follows: at room temperature, 10649 g of a 4.93% by weight aqueous solution of poly(styrene sulphonic acid)[PSS] (Mw=290,000) and 39.351 kg deionized water were mixed in a 60 L Büchi reaction vessel equipped with a stirrer (180 rpm) and a nitrogen inlet. After bubbling nitrogen through this mixture for 30 minutes, 213 g (1.5 mol) of EDOT was added to this solution. The reaction mixture was heated to 30° C. The concentration of oxygen in this solution was 0.08 mg/L as measured with a Knick Process Unit 73 $O_2$, using InPro 6000 Series $O_2$. 3.75 g $Fe_2(SO_4)_3$ $9H_2O$ and 428.2 g $Na_2S_2O_8$ were then added to initiate the polymerization reaction. The reaction mixture was stirred at 30° C. for 7 h, after which a further 71.6 g of $Na_2S_2O_8$ was added. After an additional reaction time of 16 h the reaction mixture was cooled to RT and N2-bubbling was stopped. The dispersion was treated 2 times with ion exchanger (5000 ml Lewatit™ S100MB+8320 ml Lewatit™ M600MB). The resulting mixture was additionally thermally treated at 95° C. for 2 h and the resulting viscous mixture (50730 g, 1.03 wt %) was first diluted with 14585 g of deionized water and secondly treated with high shear [microfluidizer at 40 MPa (400 Bar)]. This procedure yielded 65.315 kg of a 0.82 wt % blue dispersion of PEDOT/PSS with a weight ratio of PEDOT to PSS of 1:2.46.

COMPARATIVE EXAMPLES 1 TO 15

The compositions of COMPARATIVE EXAMPLES 1 to 13 were prepared by mixing the solvent given in Table 1 in the quantity also given in Table 1 with the quantity of a conventional 1.2% by weight dispersion of PEDOT/PSS with a weight ratio of PEDOT to PSS of 1:2.4 in water given in Table 1 and evaporating with stirring from the resulting mixtures by distillation at 45° C. at a vacuum of 50 hPa (mbar) giving the compositions also given in Table 1.

The content of PEDOT in these compositions, obtained by dividing the content of PEDOT/PSS by 3.4, varied between 0.27 and 1.57% by weight. The viscosities at 20° C. and a shear rate of 1 s$^{-1}$ were determined using an AR1000 plate and cone rheometer (diameter 4 cm; cone angle 2°) and are also given in Table 1.

The particle size of the PEDOT/PSS-latex particles in the composition of COMPARATIVE EXAMPLE 3 was determined with a Chemical Process Specialists CPS DCP24000 Disc Centrifuge in which particle size distributions are determined using differential centrifugal sedimentation. Particles settle in a fluid under centrifugal field according to Stokes' Law. Sedimentation velocity increases as the square of the particle diameter, so particles that differ in size by only a few percent settle at significantly different rates. In differential sedimentation, all the particles in a sample begin sedimentation as a thin band. A sample of particles was produced by diluting 1 mL of the composition with 4 mL of 1,2-propandiol and then diluting the resulting mixture with 10 mL of deionized water and then further with 3 mL of ethanol. 0.1 mL of the resulting dispersion was then added to the top of the 9.5 mL of clear liquid consisting of a 8% aqueous solution of sucrose at the start of the analysis and the particles settled down in the centrifugal field. The detector initially read maximum intensity, but the signal was reduced when particles reached the detector beam. The reduction in intensity indicated the concentration of particles in the detector beam. When a monochromatic light source is used, Mie theory light scattering can be applied to the intensity data to calculate the particle concentration. When all the particles had passed the detector, the signal returned to the original level. A plot of the particle concentration against the calculated particle diameter provided a differential distribution.

TABLE 1

| Comparative example Nr | mixture before dewatering | | 1.2 wt % PEDOT/PSS dispersion in water | (final) composition | | | | viscosity in Pa·s at shear rate of 1 s$^{-1}$ |
|---|---|---|---|---|---|---|---|---|
| | non-aqueous solvent | | | PEDOT/PSS [wt %] | non-aqueous solvent | | water [wt %] | |
| | type | quantity [g] | | | type | quantity [wt. %] | | |
| 1 | DEG | 400 | 400 | 1.006 | DEG | 84 | 15 | 10 |
| 2 | PD | 400 | 400 | 1.03 | PD | 84.97 | 14.0 | 15 |
| 3 | PD | 400 | 400 | 1.09 | PD | 89.91 | 9.0 | — |
| 4 | PD + DEG | 400 + 61.35 | 400 | 0.92 | PD + DEG | 74.98 + 11.5 | 12.6 | 16 |
| 5 | PD + DEG | 400 + 54.32 | 400 | 0.98 | PD + DEG | 81.0 + 11 | 7.02 | — |
| 6 | DEG | 300 | 300 | 1.09 | DEG | 87.91 | 11 | — |
| 7 | DEG | 200 | 400 | 1.62 | DEG | 65.38 | 33 | 50 |
| 8 | DEG | 200 | 400 | 1.66 | DEG | 68.84 | 29.5 | 70 |
| 9 | NMP | 70 | 700 | 3.28 | NMP | 23.72 | 73 | 100–300 |
| 10 | NMP | 70 | 700 | 3.64 | NMP | 28.91 | 67.45 | 200 |
| 11 | CA | 70 | 700 | 3.23 | CA | 23.77 | 73 | 100 |
| 12 | CA | 70 | 700 | 5.35 | CA | 42.59 | 52.06 | 4000 |
| 13 | DEG | 200 | 400 | 1.65 | DEG | 67.35 | 31 | 150 |

A mean latex particle size of 223 nm was found with a d10 of 223 nm and a d90 of 461 nm for the composition of COMPARATIVE EXAMPLE 3.

The compositions of COMPARATIVE EXAMPLES 1 to 10 were screen printed though the screen given in Table 2 onto a PET film provided with the subbing layer also given in Table 2 and the print dried at 120° C. for 240 s.

Th optical density of the print was determined using a MacBeth TR234 densitometer in transmission with blue, green, red and visible filters. The results are summarized in Table 2.

The surface resistance of the print was measured by contacting the printed layer with parallel copper electrodes each 35 mm long and 35 mm apart capable of forming line contacts, the electrodes being separated by a TEFLON® insulator. This enabled a direct measurement of the surface resistance to be realized. The results are also summarized in Table 2.

TABLE 2

| Comparative example nr | Screen | subbing layer no | $D_{blue}$ | $D_{green}$ | $D_{red}$ | $D_{vis}$ | Surface resistance [Ω/square] |
|---|---|---|---|---|---|---|---|
| 1A | P77 | 1 | 0.05 | 0.07 | 0.10 | 0.08 | 500 |
| 1B | P77 | 2 | 0.05 | 0.06 | 0.10 | 0.07 | 570 |
| 2 | P77 | 1 | 0.05 | 0.07 | 0.09 | 0.07 | 560 |
| 3 | P77 | 2 | 0.05 | 0.08 | 0.11 | 0.08 | 580 |
| 4 | P77 | 1 | 0.04 | 0.06 | 0.09 | 0.07 | 710 |
| 5 | P77 | 2 | 0.05 | 0.06 | 0.08 | 0.06 | 940 |
| 6 | P59 | 1 | 0.06 | 0.08 | 0.11 | 0.09 | 460 |
| 7 | P59 | 1 | 0.08 | 0.09 | 0.12 | 0.10 | 1150 |
| 9 | P59 | 1 | 0.19 | 0.23 | 0.28 | 0.25 | 210 |
| 11 | P59 | 1 | 0.13 | 0.16 | 0.21 | 0.17 | 460 |
| 13 | P77 | 1 | 0.06 | 0.08 | 0.11 | 0.09 | 1340 |

Further ingredients were then added to the compositions of COMPARATIVE EXAMPLES 8 and 11 to the produce screen pastes of COMPARATIVE EXAMPLES 14 and 15 respectively.

TABLE 3

| Comparative Example nr | Dispersion | added non-aqueous solvent | | PEDOT/PSS [wt %] | (final) composition | | water [wt %] |
|---|---|---|---|---|---|---|---|
| | | type | quantity [g] | | non-aq. solvent type | quantity [wt. %] | |
| 14 | 60 g of Comp. example 8 | DEG | 30 | 2.52 | NMP + DEG | 18.1 + 23.38 | 56 |
| 15 | 60 g of Comp. example 11 | DEG | 30 | 2.15 | CA + DEG | 15.84 + 33.3 | 48.6 |

The content of PEDOT in the compositions of COMPARATIVE EXAMPLES 14 and 15, obtained by dividing the content of PEDOT/PSS by 3.4, were 0.74 and 0.63% by weight respectively. The compositions of COMPARATIVE EXAMPLES 14 and 15 were screen printed though the screen given in Table 4 onto a PET film provided with the subbing layer also given in Table 4 and the print dried at 120° C. for 240 s. These prints were characterized as described for COMPARATIVE EXAMPLES 1 to 13 and the results obtained are given in Table 4.

TABLE 4

| Comparative example nr | Screen | subbing layer no | $D_{blue}$ | $D_{green}$ | $D_{red}$ | $D_{vis}$ | Surface resistance [Ω/square] |
|---|---|---|---|---|---|---|---|
| 14 | P59 | 1 | 0.12 | 0.14 | 0.18 | 0.16 | 380 |
| 15 | P59 | 1 | 0.09 | 0.11 | 0.13 | 0.11 | 940 |

COMPARATIVE EXAMPLES 16 AND 17

The compositions of COMPARATIVE EXAMPLES 16 and 17 was prepared by adding 400 g of diethylene glycol (DEG) to 400 g of a conventional 1.2% by weight dispersion of PEDOT/PSS with a weight ratio of PEDOT to PSS of 1:2.4 in water and then evaporating the resulting mixtures in a rotary evaporator at 60° C. and a vacuum of 50 hPa (mbar) giving is the composition in Table 5.

TABLE 5

| | COMPARATIVE EXAMPLE 16 | COMPARATIVE EXAMPLE 17 |
|---|---|---|
| wt % PEDOT | 0.315 | 0.307 |
| wt % PEDOT/PSS | 1.07 | 1.045 |
| wt. % DEG | 87.93 | 83.955 |
| wt % deionized water | 11.00 | 15.00 |

The viscosities at 20° C. of compositions of COMPARATIVE EXAMPLE 13 and a 1.2 wt. % dispersion of PEDOT/PSS in water were measured with increasing shear rate and the results are given for particular shear rates in Table 6.

TABLE 6

| | viscosity [Pa · s] | |
|---|---|---|
| Shear rate [$s^{-1}$] | 1.2 wt. % dispersion of PEDOT/PSS in water | Composition of COMPARATIVE EXAMPLE 17 |
| 0.10 | 0.142 | 49.20 |
| 0.50 | 0.066 | 14.74 |
| 1.00 | 0.076 | 8.962 |
| 5.01 | 0.079 | 3.251 |
| 10.00 | 0.073 | 2.227 |
| 50.12 | 0.060 | 1.032 |
| 100.00 | 0.053 | 0.761 |
| 500.00 | 0.037 | 0.376 |

This composition can be used directly for coating or different ingredients may be added to produce non-aqueous solvent containing printing inks and pastes for different printing techniques.

The composition of COMPARATIVE EXAMPLE 17 without added ingredients was screen printed through different screens onto unsubbed PET and dried at 120° C. for 120 s. These prints were characterized as described for COMPARATIVE EXAMPLES 1 to 10 and the results obtained are given in Table 7.

Prints with the composition of COMPARATIVE EXAMPLE 16 gave analogous results to those given in Table 7 with the composition of COMPARATIVE EXAMPLE 17.

TABLE 7

| | Prints with the composition of Comparative example nr. 17 | |
|---|---|---|
| screen type | surface resistance [Ω/square] | Optical density $D_{vis}$ |
| P34 | 250 | 0.17 |
| P59 | 408 | 0.08 |
| P77 | 540 | 0.07 |
| P120 | 830 | 0.04 |

COMPARATIVE EXAMPLES 18 TO 22

The compositions of COMPARATIVE EXAMPLES 18 to 22 were prepared by adding 400 g of 1,2-propandiol, optionally 49 g diethylene glycol and 400 g of a conventional 1.2% by weight dispersion of PEDOT/PSS with a weight ratio of PEDOT to PSS of 1:2.4 in water and evaporating the resulting mixture in a rotary evaporator at 60° C. under a vacuum of 50 hPa (mbar) giving the composition and subsequently adding CARBOPOL® ETD 2623 or 3-glycidoxypropyltri-methoxysilane to give the compositions given in Table 8.

TABLE 8

| | Composition of Comparative Example [% by weight] | | | | |
|---|---|---|---|---|---|
| Ingredient | Nr 18 | nr 19 | nr 20 | nr 21 | nr 22 |
| PEDOT | 0.300 | 0.279 | 0.318 | 0.279 | 0.300 |
| PEDOT/PSS | 1.02 | 0.95 | 1.08 | 0.95 | 1.02 |
| DEG | — | 11.0 | — | 11.0 | — |
| PD | 84.08 | 78.25 | 89.42 | 78.25 | 84.08 |
| 3-glycidoxypropyl-trimethoxysilane | — | — | — | — | 3.00 |
| CARBOPOL ® ETD 2623 | — | — | 0.40 | 0.40 | — |
| deionized water | 14.90 | 9.80 | 9.10 | 9.40 | 11.90 |

Screen Printing

The compositions of COMPARATIVE EXAMPLES 18 to 22 were screen printed on an AUTOSTAT™ CT7 support using a screen printer with a P120 screen and dried at 120° C. for 120 s.

Characterization of the Printed Layers

The optical densities through a visible filter and surface resistance of the prints prepared with the compositions of COMPARATIVE EXAMPLES 18 to 22 were evaluated as described for COMPARATIVE EXAMPLES 1 to 13 and the results are given in Table 9.

The adhesion of the printed layers was determined by a tape test: first scratching the layer cross-wise with a razor blade over an area of ca. 4×10 cm², applying a 10×24 cm² piece of TESAPACK® 4122 brown tape, pressing by rubbing with a hard object and finally removing the tape from one end in a single movement in an upward direction. The adhesion of the printed layers was determined visually on a scale of 0 to 5, 0 corresponding to no removal of the layer with the tape, according to the following criteria:

| | |
|---|---|
| adhesion assessment of 0: | no removal of the layer with the tape; |
| adhesion assessment of 1: | removal of an area equal to 25% of the area of the tape with the tape; |
| adhesion assessment of 2: | removal of an area equal to 50% of the area of the tape with the tape; |
| adhesion assessment of 3: | removal of an area equal to 75% of the area of the tape with the tape; |
| adhesion assessment of 4: | removal of an area equal to the area of the tape with the tape; |
| adhesion assessment of 5: | removal of an area greater than the area of the tape with the tape. |

Intermediate assessments such as 0/1, 1/2, 2/3 and 3/4 were also possible. The results of the evaluation of the adhesion of prints obtained with the compositions of COMPARATIVE EXAMPLES 18 to 22 are also given in Table 9.

TABLE 9

| | Evaluation of Comparative Example | | | | |
|---|---|---|---|---|---|
| | nr 18 | nr 19 | nr 20 | nr 21 | nr 22 |
| adhesion quality | 0 | 0 | 0 | 0 | 5 |
| optical density, $D_{vis}$ | 0.07 | 0.08 | 0.08 | 0.07 | 0.07 |
| surface resistance [ohm/square] | 560 | 1100 | 550 | 615 | 2060 |

The results in Table 9 showed that the adhesion quality was excellent and the surface resistance was low for all prints except in the case of the print using the composition of COMPARATIVE EXAMPLE 22 containing 3% by weight of 3-glycidoxypropyl-trimethoxysilane.

COMPARATIVE EXAMPLES 23 TO 34

The composition of COMPARATIVE EXAMPLE 23 was prepared as described for COMPARATIVE EXAMPLES 16 and 17 and consisted of: 0.75% by weight of PEDOT/PSS, 93% by weight of 1,2-propandiol, 5.9% by weight of water and 0.5% by weight of 3-glycidoxypropyltrimethoxysilane.

The compositions of COMPARATIVE EXAMPLES 24 to 34 were prepared by adding different surfactants in different concentrations, as given in Table 10, to the composition of COMPARATIVE EXAMPLE 23.

The compositions of COMPARATIVE EXAMPLES 23 to 34 were screen printed on an AUTOSTAT™ CT7 support, the standard layer of LUXPRINT™ 7153E and the standard layer of LUXPRINT™ 7138J through a P120 screen and dried at 120° C. for 120 s.

Evaluation of the Prints

The optical density and surface resistance of the prints on AUTOSTAT® CT7 were evaluated as described for COMPARATIVE EXAMPLES 1 to 13. The results obtained with prints prepared with the compositions of COMPARATIVE EXAMPLES 23 to 34 are given in Table 10.

The adhesion of the prints AUTOSTAT™ CT7 support, the standard layer of LUXPRINT™ 7153E and the standard layer of LUXPRINT™ 7138J was evaluated as described for COMPARATIVE EXAMPLES 18 to 22. The results obtained with prints prepared with the compositions of COMPARATIVE EXAMPLES 23 to 34 are also given in Table 10.

The mottle of the printed layers on AUTOSTAT™ CT7 support and the standard layers of LUXPRINT™ 7153E and LUXPRINT™ 7138J was determined visually on a scale of 0 to 5, 0 corresponding to a good mottle-free layer, according to the following criteria:

| | |
|---|---|
| mottle assessment of 0: | no mottle observed upon visual inspection; |
| mottle assessment of 1: | mottle over between 1 and 10% of print; |
| mottle assessment of 2: | mottle over between 11 and 20% of print; |
| mottle assessment of 3: | mottle over between 21 and 40% of print; |
| mottle assessment of 4: | mottle over between 41 and 60% of print; |
| mottle assessment of 5: | mottle over more than 60% of the print. |

The mottle results for prints obtained with the compositions of COMPARATIVE EXAMPLES 23 to 34 are also given in Table 10.

The results in Table 10 show that the incorporation of different non-ionic surfactants reduces the mottle and improves the adhesion of prints of compositions according to the present COMPARATIVE.

TABLE 10

| Composition of Comparative example nr | surfactant in composition | | layer on AUTOSTAT CT7 | | | assessment of mottle in layer on | | |
|---|---|---|---|---|---|---|---|---|
| | Nr. | wt. % | surface resistance [Ω/square] | $D_{vis}$ | adhesion | AUTOSTAT CT7 | LUXPRINT 7138J | LUXPRINT 7153E |
| 23 | — | — | 2380 | 0.02 | 0 | 1 | 4 | 4 |
| 24 | 03 | 0.125 | 2280 | 0.02 | — | 1 | 3 | 4 |
| 25 | 02 | 0.125 | 2640 | 0.02 | — | 1 | 2 | 2 |
| 26 | 04 | 0.125 | 2260 | 0.03 | 0 | 1 | 1–2 | 4 |
| 27 | | 0.25 | | 0.03 | 0 | 1 | 2 | 2 |
| 28 | | 0.50 | | 0.03 | 0 | 1 | 2 | 2 |
| 29 | 05 | 0.125 | 2090 | 0.03 | 0 | 1 | 1–2 | 3 |
| 30 | 19 | 1.0 | 2090 | 0.03 | 0 | 1 | 4 | 5 |
| 31 | 06 | 0.125 | 4000 | 0.03 | 1 | 1 | 3 | 4 |
| 32 | | 0.25 | | 0.03 | 1 | 1 | 3 | 4 |
| 33 | | 0.50 | | 0.03 | 0–1 | 1 | 1–2 | 3 |
| 34 | | 1.0 | | 0.03 | 2 | 2 | 1 | 1–2 |

COMPARATIVE EXAMPLES 35 to 41

The starting material for the compositions of COMPARATIVE EXAMPLES 35 to 41 was prepared by adding 34.68 kg of 1,2-propandiol and 3.84 kg of diethylene glycol to 25.6 kg of a conventional 1.2% by weight dispersion of PEDOT/PSS with a weight ratio of PEDOT to PSS of 1:2.4 in a reactor, then distilling off 15 L of water by heating with an oil bath at 62° C. under stirring at a vacuum which varied between 31 and 55 hPa (mbar) over a period of 234 minutes, cooling the resulting mixture to 20° C. and then distilling off a further 4.85 L of water by heating with an oil bath at 60.5° C. under stirring at a vacuum which varied between 24 and 26 hPa (mbar) over a period of 287 minutes. The water content in the 38.1 kg of paste produced, as determined by the Karl Fischer method, was 3.9% by weight.

The compositions of COMPARATIVE EXAMPLE 35 to 41 were then prepared by adding deionized water, ZONYL® FSO-100, silicone antifoam agent X50860A and CARBOPOL® AQUA 30 with 30 minutes stirring in the quantities given in Table 11.

The particle sizes of the PEDOT/PSS latex in the compositions of COMPARATIVE EXAMPLES 35–37 were determined as described above for the composition of COMPARATIVE EXAMPLE 3 and the mean latex particle sizes, d10-values and d90-values of the particle size distribution of the PEDOT/PSS-latexes in these compositions are given in Table 13.

TABLE 13

| Comparative Example Nr. | mean PEDOT/PSS-latex size [nm] | d10 of PEDOT/PSS latex [nm] | d90 of PEDOT/PSS latex [nm] |
| --- | --- | --- | --- |
| 35 | 184 | 46 | 344 |
| 36 | 187 | 44 | 342 |
| 37 | 182 | 53 | 327 |

Viscosity Measurement

The viscosities at 20° C. of screen paste of COMPARATIVE EXAMPLES 35 and 36 were measured with an AR1000 plate and cone rheometer (diameter 4 cm; cone angle 2°) with increasing shear rate at particular shear rates are given in Table 14.

TABLE 11

Ingredient quantities [g] used in preparation of compositions of Comparative Example

|  | Nr 35 | nr 36 | nr 37 | nr 38 | Nr 39 | nr 40 | nr 41 |
| --- | --- | --- | --- | --- | --- | --- | --- |
| starting material | 4,950 | 8,372.5 | 3,726 | 92.83 | 92.09 | 93.09 | 87.65 |
| 2-glycidoxypropyl-trimethoxysilane | 25 | 42.5 | — | — | 0.5 | — | 0.5 |
| CARBOPOL ® AQUA 30 | — | — | 7.5 | 2.0 | 2.0 | 2.0 | — |
| CARBOPOL ® EP2 | — | — | — | — | — | — | 2.0 |
| Deionized water | 9.4 | 31.9 | 30.5 | 4.80 | 4.66 | 4.72 | 9.1 |
| ZONYL ® FSO-100* | 6.25 | 21.25 | 9.5 | 0.25 | 0.25 | 0.125 | 0.25 |
| X50860A | 6.25 | 21.25 | 9.5 | 0.12 | 0.5 | — | 0.5 |
| DEG | 3 | 10.6 | 5 | — | — | 0.063 | — |
| Total | 5,000 | 8,500 | 3,788 | 100 | 100 | 100 | 100 |

*ZONYL ® FSO is a 50% by wt solution of ZONYL ® FSO-100 in a mixture of 50% by wt of water and 50% by wt of ethylene glycol The final compositions are given in Table 12.

TABLE 12

COMPOSITION OF COMPARATIVE EXAMPLES [% by weight]

| Ingredient | nr 35 | nr 36 | Nr 37 | nr 38 | Nr 39 | nr 40 | Nr 41 |
| --- | --- | --- | --- | --- | --- | --- | --- |
| PEDOT | 0.224 | 0.224 | 0.224 | 0.209 | 0.208 | 0.210 | 0.197 |
| PEDOT/PSS | 0.760 | 0.760 | 0.760 | 0.712 | 0.706 | 0.715 | 0.672 |
| DEG | 9.000 | 9.000 | 9.000 | 8.417 | 8.350 | 8.460 | 7.947 |
| PD | 85.040 | 84.540 | 84.540 | 79.094 | 78.463 | 79.467 | 74.681 |
| 3-glycidoxypropyl-trimethoxysilane | 0.500 | 0.500 | — | — | 0.500 | — | 0.500 |
| CARBOPOL ® AQUA 30 | — | — | 0.2000 | 2.000 | 2.000 | 2.000 | — |
| CARBOPOL ® EP2 | — | — | — | — | — | — | 2.000 |
| ZONYL ® FSO100 | 0.125 | 0.250 | 0.250 | 0.250 | 0.250 | 0.125 | 0.250 |
| X50860A | 0.120 | 0.240 | 0.240 | 0.120 | 0.500 | — | 0.500 |
| ethylene glycol | 0.063 | 0.125 | 0.125 | — | — | 0.063 | — |
| deionized water | 4.262 | 4.375 | 4.885 | 9.407 | 9.231 | 9.17 | 13.450 |

TABLE 14

| Shear rate [s$^{-1}$] | 1.2 wt. % PEDOT/ PSS dispersion in water | Composition of Comp. Example 35 | Composition of Comp. Example 36 | Composition of Comp. Example 37 | Composition of Comp. Example 39 |
|---|---|---|---|---|---|
| 0.10 | 0.142 | 17.59 | 18.66 | 37.55 | 111.1 |
| 0.50 | 0.066 | 7.843 | 8.262 | 14.08 | |
| 0.63 | | | | | 28.8 |
| 1.00 | 0.076 | 5.540 | 5.864 | 9.103 | 21.25 |
| 5.01 | 0.079 | 2.506 | 2.658 | 3.380 | |
| 6.31 | | | | | 6.899 |
| 10.00 | 0.073 | 1.793 | 1.903 | 2.258 | 5.345 |
| 50.12 | 0.060 | 0.851 | 0.908 | 0.956 | |
| 63.10 | | | | | 2.109 |
| 100.00 | 0.053 | 0.634 | 0.674 | 0.686 | 1.684 |
| 500.00 | 0.037 | 0.325 | 0.348 | 0.343 | |
| 631.00 | | | | | 0.6579 |

The increase in viscosity upon addition of CARBOPOL® AQUA 30 is partly due to the non-Newtonian behaviour of the CARBOPOL® AQUA 30 solution itself as can be seen from the dependence of viscosity upon shear rate of a 2% by weight solution of CARBOPOL® AQUA 30 in the same medium given in Table 15.

TABLE 15

| Shear rate [s$^{-1}$] | Viscosity [Pa, s] of 2% CARBOPOL ® AQUA 30 in a solvent mixture consisting of 87% PG, 9% DEG, 3% water, 0.25% ZONYL ® FSO100 and 0.5% silicone antifoam agent X50860A |
|---|---|
| 0.10 | 2.479 |
| 0.63 | 0.820 |
| 1.00 | 0.633 |
| 6.31 | 0.475 |
| 10.00 | 0.443 |
| 63.10 | 0.308 |
| 100.00 | 0.280 |
| 631.00 | 0.197 |

A similar situation is also observed with CARBOPOL® EP2 as can be seen from the dependence of viscosity upon shear rate for the composition of COMPARATIVE EXAMPLE 41 and a solution of CARBOPOL® EP2 in the same medium is given in Table 16.

TABLE 16

| Shear rate [s$^{-1}$] | Composition of Comparative Example nr 41 | Solution of 2% CARBOPOL ® EP2 in a solvent mixture consisting of 87% PG, 9% DEG, 3% water, 0.25% ZONYL ® FSO100 and 0.5% silicone antifoam agent X50860A |
|---|---|---|
| 0.10 | 188.6 | 2.962 |
| 0.63 | 53.960 | 2.014 |
| 1.00 | 40.210 | 1.829 |
| 6.31 | 12.670 | 1.250 |
| 10.00 | 9.517 | 1.127 |
| 63.10 | 3.213 | 0.706 |
| 100.00 | 2.494 | 0.630 |
| 631.00 | 0.939 | 0.360 |

Screen Printing

The compositions of COMPARATIVE EXAMPLES 35 to 38 and 40 were screen printed on an AUTOSTAT™ CT7 support, the standard layer of LUXPRINT™ 7153E and the standard layer of LUXPRINT™ 7138J using a screen printer with a P120 screen and dried at 120° C. for 120 s.

Characterization of the Printed Layers

For coatings of the compositions of COMPARATIVE EXAMPLES 35 to 38 and 40 on AUTOSTAT® CT7, the optical densities through a visible filter were evaluated as described for COMPARATIVE EXAMPLES 1 to 13, the haze was determined spectrally according to ASTM D1003-61 and the print quality assessed visually. The results for printing through a P120 mesh are given in Table 17.

The haze values reflect the amount of light-scattering in the printed layer and increase as the number of visually observable flecks, i.e. number of light-scattering spots in the print, increases. Lower haze and fewer or no flecks were observed with prints produced with the compositions of COMPARATIVE EXAMPLES 37, 38 and 40 than with the prints of COMPARATIVE EXAMPLES 35 and 36.

TABLE 17

| | Print on AUTOSTAT ™ CT7 of composition of Comparative Example | | | | |
|---|---|---|---|---|---|
| | Nr 35 | Nr 36 | Nr 37 | nr 38 | nr 40 |
| Print quality | flecks | flecks | A few flecks | no flecks | no flecks |
| Haze [%] | 5.99 | 5.66 | — | 3.57 | 2.57 |
| D$_{vis}$ | 0.03 | 0.03 | 0.03 | 0.03 | 0.03 |

For coatings of the compositions of COMPARATIVE EXAMPLES 35 to 38 and 40 on AUTOSTAT® CT7, MAKROFOL DE 1-1 SC1, PET with subbing layer 1 and layers of LUXPRINT® 7138J and LUXPRINT™ 7153E, the mottle of the prints was evaluated as described for COMPARATIVE EXAMPLES 23 to 34. The results for printing through a P120 mesh are given in Table 18.

Very low mottle was observed upon printing with all compositions on all the films and on the layer of LUX-PRINT® 7138J. Only in the case of prints on LUXPRINT® 7153E was a significant variation in mottle observed as a function of coating composition with the compositions of COMPARATIVE EXAMPLES 35 and 36 performing significantly more poorly than the compositions of COMPARATIVE EXAMPLES 37, 38 and 40.

TABLE 18

| MOTTLE TEST | Print using composition of Comparative Example | | | | |
|---|---|---|---|---|---|
| | nr 35 | nr 36 | nr 37 | nr 38 | nr 40 |
| AUTOSTAT ™ CT7 | 1 | 1 | 1 | 1 | 1 |
| MAKROFOL DE 1-1 SC1 | 1 | 1 | — | 1 | 1 |
| PET with subbing layer no 1 | 1 | 1 | — | 1 | 1 |
| LUXPRINT 7138J | 2 | 2 | 0–1 | 0–1 | 1 |
| LUXPRINT 7153E | 4 | 3 | 1 | 1 | 1–2 |

For coatings of the compositions of COMPARATIVE EXAMPLES 35 to 38 and 40 on AUTOSTAT® CT7, MAKROFOL DE 1-1 SC1, PET with subbing layer 1 and layers of LUXPRINT® 7138J and LUXPRINT™ 7153E, the adhesion quality was evaluated as described for COMPARATIVE EXAMPLES 18 to 22. The results for printing through a P120 mesh are given in Table 19.

TABLE 19

| ADHESION QUALITY | Print using composition of Comparative Example | | | | |
|---|---|---|---|---|---|
| | nr 35 | nr 36 | nr 37 | nr 38 | nr 40 |
| AUTOSTAT ™ CT7 | 0 | 0 | 0 | 0 | 0 |
| MAKROFOL ™ DE 1-1 SC1 | 3 | 3 | — | 3 | — |
| PET with subbing layer no 1 | 0 | 0 | — | 0 | 0 |
| LUXPRINT 7138J | 1 | 0 | 0 | 0 | 0 |
| LUXPRINT 7153E | 0 | 0 | 0 | 0 | 0 |

Excellent Adhesion was Observed Except for MAKROFOL™ DE 1-1 SC1.

For coatings of the compositions of COMPARATIVE EXAMPLES 35 to 38 and 40 on AUTOSTAT® CT7, MAKROFOL DE 1-1 SC1, PET with subbing layer 1 and layers of LUXPRINT® 7138J and LUXPRINT™ 7153E, the surface resistance of the prints were evaluated as described for COMPARATIVE EXAMPLES 1 to 13. The results for printing through a P120 mesh are given in Table 20.

TABLE 20

| | SURFACE RESISTANCE in [ohm/square] of a print using composition of Comparative Example | | | | |
|---|---|---|---|---|---|
| | nr 35 | nr 36 | nr 37 | nr 38 | nr 40 |
| AUTOSTAT ™ CT7 | 1423 | 1390 | 2200 | 1723 | 1523 |
| MAKROFOL DE 1-1 SC1 | 1393 | 1343 | — | 1546 | 1503 |
| PET with subbing layer no 1 | 1296 | 1256 | — | 1583 | 1566 |
| LUXPRINT 7138J | 3150 | 2360 | 5700 | 4050 | 2200 |
| LUXPRINT 7153E | 5200 | 1800 | 2390 | 1725 | 1850 |

The surface resistances for prints on film produced with the compositions of COMPARATIVE EXAMPLES 35 and 36 were significantly lower than those produced with the compositions of COMPARATIVE EXAMPLES 37, 38 and 40. The variation in the surface resistances observed on LUXPRINT® 7138J and LUXPRINT® 7153E layers was due to layer thickness variation as a result of the different wetting behaviour of the different compositions.

The results for layers printed through different mesh sizes onto AUTOSTAT CT7 and unsubbed PET are given in Table 21. The surface resistance increased significantly and the optical density decreased significantly with increasing layer thickness.

TABLE 21

| | Comp. Example 35 | | Evaluation of prints on AUTOSTAT CT7 | | | | | |
|---|---|---|---|---|---|---|---|---|
| | Unsubbed PET | | Comparative Example 35 | | | Comparative Example 36 | | |
| Silk Screen type | Surface resistance [Ω/square] | Dvis | adhesion | surface resistance [Ω/square] | Dvis | Adhesion | surface resistance [Ω/square] | Dvis |
| P43 | — | — | — | 423 | 0.09 | — | 463 | 0.09 |
| P59 | — | — | — | 562 | 0.08 | — | 586 | 0.07 |
| P79 | — | — | 0 | 700 | 0.05 | — | 796 | 0.05 |
| P120 | 1200 | 0.03 | 0 | 1423 | 0.03 | 0 | 1390 | 0.03 |

COMPARATIVE EXAMPLES 42 TO 45

The compositions of COMPARATIVE EXAMPLE 42 to 45 were prepared from the starting material used in COMPARATIVE EXAMPLES 35 to 41 by adding deionized water, ZONYL FSO, 3-glycidoxypropyltrimethoxy-silane, silicone antifoam agent X50860A and optionally Flexonyl® Blue B2G with 30 minutes stirring in the quantities given in Table 22.

TABLE 22

| | Ingredient quantities [g] used in preparation of compositions of Comparative Example | | | |
|---|---|---|---|---|
| | nr 42 | nr 43 | nr 44 | nr 45 |
| Starting material | 297 | 295.5 | 99.0 | 98.5 |
| 2-glycidoxypropyl-trimethoxysilane | 1.5 | 1.5 | 0.5 | 0.5 |
| ZONYL ® FSO | 0.75 | 1.5 | 0.25 | 0.5 |
| X50860A | 0.75 | 1.5 | 0.25 | 0.5 |
| PIG01 | — | — | 6.0 | 6.0 |

The final compositions are given in Table 23.

TABLE 23

| | COMPOSITION OF COMPARATIVE EXAMPLES [% by weight] | | | |
|---|---|---|---|---|
| Ingredient | nr 42 | nr 43 | Nr 44 | nr 45 |
| PEDOT | 0.224 | 0.223 | 0.211 | 0.211 |
| PEDOT/PSS | 0.762 | 0.759 | 0.719 | 0.716 |
| DEG | 9.032 | 8.986 | 8.521 | 8.477 |
| PD | 85.344 | 84.913 | 80.513 | 80.107 |
| 3-glycidoxypropyl-trimethoxysilane | 0.500 | 0.500 | 0.472 | 0.472 |
| ZONYL ® FSO100 | 0.125 | 0.250 | 0.118 | 0.118 |
| X50860A | 0.250 | 0.500 | 0.236 | 0.472 |
| ethylene glycol | 0.063 | 0.125 | 0.059 | 0.118 |
| deionized water | 3.924 | 3.967 | 3.702 | 3.742 |
| PIG01 | — | — | 5.660 | 5.660 |

\* ZONYL ® FSO is a 50% by wt solution of ZONYL ® FSO100 a mixture of 50% by wt of water and 50% by wt of ethylene glycol The compositions of COMPARATIVE EXAMPLES 42 to 45 were screen printed with a manual press and a P120 screen onto AUTOSTAT CT7 support. The surface resistance and optical densities were determined as described for COMPARATIVE EXAMPLES 1 to 15. The results are given in Table 24.

TABLE 24

| Comparative example nr | Screen | $D_{blue}$ | $D_{green}$ | $D_{red}$ | $D_{vis}$ | Surface resistance [Ω/square] |
|---|---|---|---|---|---|---|
| 42 | P120 | 0.02 | 0.02 | 0.04 | 0.03 | 1663 |
| 43 | P120 | 0.02 | 0.03 | 0.04 | 0.03 | 1917 |
| 44 | P120 | 0.08 | 0.18 | 0.83 | 0.38 | 2843 |
| 45 | P120 | 0.09 | 0.18 | 0.74 | 0.37 | 3583 |

The optical density results for prints printed with the compositions of COMPARATIVE EXAMPLES 44 and 45 show them to be transparent and blue.

COMPARATIVE EXAMPLES 46 TO 51

The compositions of COMPARATIVE EXAMPLE 46 to 51 were prepared from the starting material used in COMPARATIVE EXAMPLES 35 to 41 by adding deionized water, different non-ionic and anionic fluoro-surfactants as given in Table 25, 3-glycidoxypropyltrimethoxy-silane and silicone antifoam agent X50860A with 30 minutes stirring in the quantities given in Table 25.

TABLE 25

| | Composition of Comparative Example | | | | | |
|---|---|---|---|---|---|---|
| Ingredient | 46 | 47 | 48 | 49 | 50 | 51 |
| starting material | 98.75 | 98.5 | 98.0 | 97.22 | 98.29 | 98.75 |
| 3-glycidoxypropyl-trimethoxysilane | 0.5 | 0.5 | 0.5 | 0.5 | 0.5 | 0.5 |
| Zonyl ® FSO100 | 0.25 | — | — | — | — | — |
| Zonyl ® FSO | — | 0.5 | — | — | — | — |
| Zonyl ® FSA | — | — | 1 | — | — | — |
| Zonyl ® FSE | — | — | — | 1.78 | — | — |
| Zonyl ® FSP | — | — | — | — | 0.71 | — |
| ammonium perfluoro-octanoate | — | — | — | — | — | 0.25 |
| X50860A | 0.5 | 0.5 | 0.5 | 0.5 | 0.5 | 0.5 |

The final compositions are given in Table 26.

TABLE 26

| | Composition of Comparative Example | | | | | |
|---|---|---|---|---|---|---|
| Ingredient | 46 | 47 | 48 | 49 | 50 | 51 |
| PEDOT/PSS | 0.762 | 0.760 | 0.756 | 0.750 | 0.758 | 0.762 |
| DEG | 9.023 | 9.000 | 8.954 | 8.883 | 8.981 | 9.023 |
| PD | 84.754 | 84.540 | 84.110 | 83.441 | 84.359 | 84.754 |
| 3-glycidoxypropyl-trimethoxysilane | 0.500 | 0.500 | 0.500 | 0.500 | 0.500 | 0.500 |
| Zonyl ® FSO100 (active) | 0.250 | — | — | — | — | — |
| Zonyl ® FSO (active) | — | 0.250 | — | — | — | — |
| Zonyl ® FSA (active) | — | — | 0.250 | — | — | — |
| Zonyl ® FSE (active) | — | — | — | 0.250 | — | — |
| Zonyl ® FSP (active) | — | — | — | — | 0.249 | — |
| Ammonium perfluoro-octanoate | — | — | — | — | — | 0.012 |
| silicone antifoam agent X50860A | 0.240 | 0.240 | 0.240 | 0.240 | 0.240 | 0.240 |
| ethylene glycol | — | 0.125 | — | 1.071 | — | — |
| isopropanol | — | — | 0.325 | — | 0.319 | — |
| deionized water | 4.471 | 4.586 | 4.815 | 4.865 | 4.594 | 4.711 |

The compositions of COMPARATIVE EXAMPLES 46 to 51 were screen printed with a manual press and a P120 screen onto a AUTOSTAT CT7 support and standard Luxprint® 7138J and Luxprint® 7153E layers as described for COMPARATIVE EXAMPLES 35 to 38 and 40. The surface resistance and optical densities were determined as described for COMPARATIVE EXAMPLES 1 to 15. The mottle and adhesion quality were determined as described for COMPARATIVE EXAMPLES 23 to 34 and COMPARATIVE EXAMPLES 18 to 22. The results are given in Table 27.

TABLE 27

| | Composition of Comparative Example nr | | | | | |
|---|---|---|---|---|---|---|
| | 46 | 47 | 48 | 49 | 50 | 51 |
| $D_{vis}$ | 0.06 | 0.05 | 0.05 | 0.06 | 0.05 | 0.04 |
| Mottle test | | | | | | |
| Autostat® CT7 | 1 | 1 | 1–2 | 1 | 1–2 | 1 |
| Adhesion Quality | | | | | | |
| Autostat® CT7 | 0–1 | 0 | 0 | 0–1 | 0–1 | 0 |
| Luxprint® 7138J | 0 | 0 | 0 | 0–1 | 4 | 0 |
| Luxprint® 7153E | 0 | 0 | 0 | 4 | 4 | 0 |
| Surface resistance in ohm/square | | | | | | |
| Autostat® CT7 | 695 | 773 | 833 | 763 | 786 | 850 |
| Luxprint® 7138J | 3090 | 2900 | 2350 | 1475 | 1400 | 3600 |
| Luxprint® 7153E | 710 | 740 | 705 | 875 | 775 | 795 |

The mottle of layers of the compositions of COMPARATIVE EXAMPLES 46 to 51 were either good or very good, very low mottle being observed with layers containing both non-ionic and anionic surfactants.

Excellent adhesion on the standard Luxprint® 7138J and Luxprint® 7153E layers was realized both with compositions with non-ionic surfactant (COMPARATIVE EXAMPLES 46 and 47) and with compositions with anionic surfactants (COMPARATIVE EXAMPLES 48 and 51). However, the compositions of COMPARATIVE EXAMPLES 49 and 50, with phosphate anionic surfactants, gave poor adhesion on one or both layers. In the case of Autostat® CT7 all the compositions realized excellent or very good adhesion, regardless of whether the compositions contained non-ionic or anionic surfactants.

The surface resitivities realized on Autostat® CT7 and the standard Luxprint® 7138J and Luxprint® 7153E layers varied with the choice of surfactant. The lower surface resistances realized on the standard Luxprint® 7138J with compositions containing ZONYL® FSE and ZONYL® FSP, both anionic phosphate surfactants (see COMPARATIVE EXAMPLES 49 and 50) are notable, but this in the case of the composition of COMPARATIVE EXAMPLE 50 was associated with poor adhesion.

These results clearly show that non-ionic and anionic surfactants can be used in the compositions according to the present COMPARATIVE.

COMPARATIVE EXAMPLES 52 TO 58

The compositions of COMPARATIVE EXAMPLES 52 to 58 were prepared by mixing the solvent given in Table 28 in the quantity also given in Table 28 to the quantity of a conventional 1.2% by weight dispersion of PEDOT/PSS with a weight ratio of PEDOT to PSS of 1:2.4 in water given in Table 28 and evaporating with stirring from the resulting mixtures by distillation at 60° C. at a vacuum of 50 hPa (mbar) giving the compositions also given in Table 28. The content of PEDOT in these compositions, obtained by dividing the content of PEDOT/PSS by 3.4, varied between 0.53 and 1.03% by weight.

The compositions of COMPARATIVE EXAMPLES 52 to 58 were screen printed though the screen given in Table 29 onto AUTOSTAT® CT7 and the print dried at 120° C. for 240 s.

TABLE 28

| | mixture before dewatering | | | | (final) composition | | | | |
|---|---|---|---|---|---|---|---|---|---|
| Comparative | non-aqueous solvent | | 1.2 wt % PEDOT/PSS | wt % | PEDOT/ | non-aqueous solvent | | | surfactant |
| example | | quantity | dispersion | water | PSS | | quantity | water | |
| Nr | type | [g] | in water | removed | [wt %] | type | [wt. %] | [wt %] | nr.  wt % |
| 52 | PD | 50 | 150 | 68.2 | 1.8 | PD | 50 | 47.2 | 05  1 |
| 53 | PD | 75 | 150 | 85.0 | 1.8 | PD | 75 | 22.2 | 05  1 |
| 54 | PD | 20 | 267 | 71.3 | 3.2 | PD | 20 | 75.8 | 11  1 |
| 55 | DEG | 20 | 291.7 | 74.5 | 3.5 | DEG | 20 | 73.6 | 11  2.9 |
| 56 | DEG | 20 | 241.7 | 68.7 | 2.9 | DEG | 20 | 74.7 | 11  2.4 |
| 57 | PD + DEG | 17 + 17 | 200 | 68.0 | 2.4 | PD + DEG | 17 + 17 | 63.26 | *   0.34 |
| 58 | DEG | 17 | 241.7 | 66.9 | 2.9 | DEG | 17 | 79.1 | 05  1 |

* a 2% by weight dispersion of $TiO_2$ in PD

The surface resistance and optical densities were determined as described for COMPARATIVE EXAMPLES 1 to 15. The results are summarized in Table 29.

TABLE 29

| Composition of Comp. example nr | P48 screen | | | P77 screen | | |
|---|---|---|---|---|---|---|
| | layer quality | $D_{vis}$ | Surface resistance [Ω/square] | layer quality | $D_{vis}$ | Surface resistance [Ω/square] |
| 52 | excellent | 0.16 | 150 | excellent | 0.10 | 250 |
| 53 | — | — | — | many micro-bubbles | 0.07 | 430 |
| 54 | — | — | — | excellent | 0.15 | 175 |
| 55 | a few bubbles | 0.25 | 85 | — | — | — |
| 56 | a few bubbles | 0.21 | 100 | many bubbles | 0.18 | 115 |
| 57 | marginal adhesion | 0.40 | 140 | — | — | — |
| 58 | good adhesion | 0.21 | 85 | — | — | — |

The results in Table 29 show that there is significant reduction in surface resistance upon increasing the concentration of PEDOT/PSS in the composition coated.

COMPARATIVE EXAMPLES 59 TO 69

The composition for preparing the compositions of COMPARATIVE EXAMPLES 59 to 69 was prepared by first adding 18 kg of 1,2-propandiol and 2 kg of diethylene glycol to 20 kg of a conventional 1.2% by weight dispersion of PEDOT/PSS with a weight ratio of PEDOT to PSS of 1:2.4 in water, then evaporating water with stirring at 60° C. and a vacuum of 50 hPa (mbar) until 15.05 kg of liquid (mainly water) had been removed and finally adding the ingredients given in Table 30 to 297 g thereof with stirring to obtain the starting composition given therein.

TABLE 30

| | quantities [g] used in preparation of compositions of Comp. Examples 59 to 69 |
|---|---|
| Starting material | 297 |
| 2-glycidoxypropyltrimethoxysilane | 1.5 |
| ZONYL ® FSO | 0.75 |
| X50860A | 0.75 |

PIG01 to PIG07 were then added to the composition given in Table 30 in the quantities necessary to obtain the compositions of COMPARATIVE EXAMPLES 59 to 69 given in Table 31 below.

The pastes of COMPARATIVE EXAMPLES 59 to 69 were screen printed through a P43 mesh using a hand screen printing press onto an AUTOSTAT® CT7 support and layers of LUXPRINT® 7138J and LUXPRINT™ 7153E and dried at 120° C. for 2 minutes for AUTOSTAT® CT7 and 130° C. for 5 minutes for the layers of LUXPRINT® 7138J and LUXPRINT™ 7153E. The print quality, adhesion, surface resistance and optical density were then evaluated as described for COMPARATIVE EXAMPLES 1 to 15. The results for prints on AUTOSTAT® CT7 are given in Table 32.

TABLE 32

| Comparative Example number | Properties of layers coated through P43 screen on Autostat ® CT7 | | | | | |
|---|---|---|---|---|---|---|
| | adhesion using Tesapack 4122 | surface resistance [Ω/square] | optical density in reflection | | | |
| | | | $d_{blue}$ | $d_{green}$ | $d_{red}$ | $d_{vis}$ |
| 59 | 0 | 410 | 0.25 | 0.48 | 2.12 | 0.80 |
| 60 | 0 | 360 | 0.21 | 0.34 | 1.34 | 0.59 |
| 61 | 0 | 430 | 1.53 | 0.22 | 0.17 | 0.20 |
| 62 | 0 | 330 | 1.17 | 0.22 | 0.19 | 0.21 |
| 63 | 0 | 410 | 1.11 | 0.24 | 0.18 | 0.22 |
| 64 | 0 | 440 | 0.80 | 0.21 | 0.19 | 0.21 |
| 65 | 0 | 370 | 0.14 | 0.18 | 0.44 | 0.27 |
| 66 | 0 | 330 | 0.22 | 0.27 | 0.49 | 0.36 |
| 67 | 1 | 340 | 0.15 | 0.19 | 0.29 | 0.21 |

TABLE 31

| Ingredient | COMPOSITION OF COMPARATIVE EXAMPLE NR. [% by weight] | | | | | | | | | | |
|---|---|---|---|---|---|---|---|---|---|---|---|
| | 59 | 60 | 61 | 62 | 63 | 64 | 65 | 66 | 67 | 68 | 69 |
| PEDOT | 0.306 | 0.312 | 0.306 | 0.312 | 0.294 | 0.306 | 0.312 | 0.312 | 0.312 | 0.312 | 0.306 |
| PEDOT/PSS | 1.04 | 1.06 | 1.04 | 1.06 | 1.00 | 1.04 | 1.06 | 1.06 | 1.06 | 1.06 | 1.04 |
| DEG | 7.79 | 7.92 | 7.79 | 7.92 | 7.53 | 7.79 | 7.92 | 7.92 | 7.92 | 7.92 | 7.79 |
| PD | 69.87 | 71.04 | 69.87 | 71.04 | 67.53 | 69.87 | 71.04 | 71.04 | 71.04 | 71.04 | 69.87 |
| 3-glycidoxypropyl-trimethoxysilane | 0.5 | 0.5 | 0.5 | 0.5 | 0.5 | 0.5 | 0.5 | 0.5 | 0.5 | 0.5 | 0.5 |
| CARBOPOL ® AQUA 30 | 2.0 | 2.0 | 2.0 | 2.0 | 2.0 | 2.0 | 2.0 | 2.0 | 2.0 | 2.0 | 2.0 |
| ZONYL ® FSO100 | 0.25 | 0.25 | 0.25 | 0.25 | 0.25 | 0.25 | 0.25 | 0.25 | 0.25 | 0.25 | 0.25 |
| X50860A | 0.024 | 0.024 | 0.024 | 0.024 | 0.024 | 0.024 | 0.024 | 0.024 | 0.024 | 0.024 | 0.024 |
| PIG01 | 0.6 | 0.3 | — | — | — | — | — | — | — | — | — |
| PIG02 | — | — | 1.0 | 0.5 | — | — | — | — | — | — | — |
| PIG03 | — | — | — | — | 1.2 | 0.6 | — | — | — | — | — |
| PIG04 | — | — | — | — | — | 0.6 | — | — | — | — | — |
| PIG05 | — | — | — | — | — | — | 1.5 | — | — | — | — |
| PIG06 | — | — | — | — | — | — | — | 1.5 | — | — | — |
| PIG07 | — | — | — | — | — | — | — | — | — | 0.57 | 1.14 |
| deionized water | 17.92 | 16.90 | 17.52 | 16.70 | 19.97 | 17.92 | 16.60 | 15.70 | 15.70 | 15.70 | 17.38 |

TABLE 32-continued

Properties of layers coated through P43 screen on Autostat ® CT7

| Comparative Example number | adhesion using Tesapack 4122 | surface resistance [Ω/square] | optical density in reflection | | | |
|---|---|---|---|---|---|---|
| | | | $d_{blue}$ | $d_{green}$ | $d_{red}$ | $d_{vis}$ |
| 68 | 0–1 | 370 | 1.01 | 0.98 | 0.88 | 0.91 |
| 69 | 0 | 400 | 1.78 | 1.62 | 1.52 | 1.59 |

Significantly coloured prints were obtained with excellent adhesion and low surface resistances: ca. 400 Ω/square were obtained with all pastes of COMPARATIVE EXAMPLES 59 to 69. The properties of the prints appeared to be little affected by the choice of pigment.

The results for prints on layers of LUXPRINT® 7138J and LUXPRINT™ 7153E are given in Table 33.

TABLE 33

| Comparative Example number | P43 coating on 7153 layer surface resistance [Ω/square] | | P43 coating on 7138 layer surface resistance [Ω/square] | |
|---|---|---|---|---|
| | single layer | double layer | single layer | double layer |
| 59 | 440 | — | 560 | — |
| 60 | 330 | 170 | 390 | 170 |
| 61 | 390 | 200 | 410 | 220 |
| 62 | 340 | 180 | 340 | 180 |
| 63 | 410 | 200 | 460 | 214 |
| 64 | 400 | 230 | 430 | 220 |
| 65 | 350 | 190 | 370 | 200 |
| 66 | 310 | 170 | 390 | 165 |
| 67 | 340 | 160 | 400 | 160 |
| 68 | 320 | 170 | 330 | 160 |
| 69 | 380 | 185 | 490 | 190 |

Again single prints obtained with the pastes of COMPARATIVE EXAMPLES 59 to 69 all had surface resistances of ca. 400 Ω/square, which decreased to ca. 200 Ω/square when a second print was printed on top of the first print.

These results show that pigmented compositions, according to the present COMPARATIVE, can be used to produce prints with significant optical densities with surface resistances of ca. 400 Ω/square independent of the choice of pigment.

COMPARATIVE EXAMPLE 70 TO 72

The starting compositions for preparing the compositions of COMPARATIVE EXAMPLES 70 and 71 and COMPARATIVE EXAMPLE 72 respectively were prepared by first adding 594 g of 1,2-propandiol and 6 g of N-methylpyrrolidinone and 540 g of 1,2-propandiol and 60 g of N-methyl-pyrrolidinone respectively to 400 g of a conventional 1.2% by weight dispersion of PEDOT/PSS with a weight ratio of PEDOT to PSS of 1:2.4 in water and then evaporating water with stirring by distillation at 60° C. and a vacuum of 98 kPa (0.98 bar) until 391 g and 398 g of liquid (mainly water) respectively had been removed after 70 and 90 minutes respectively. The compositions thereby obtained are given in Table 34.

TABLE 34

| | Starting composition for Comparative Examples 70 & 71 [%] | Starting composition for Comparative Example 72 [%] |
|---|---|---|
| PEDOT/PSS | 0.788 | 0.797 |
| PD | 96.7 | 89.2 |
| NMP | 0.98 | 9.9 |
| deionized water | 1.48 | 0.03 |

These compositions were then used as the starting compositions for preparing the compositions of COMPARATIVE EXAMPLES 70 and 71 and COMPARATIVE EXAMPLE 72 respectively by adding the appropriate quantities of the ingredients given in Table 35 to prepare the compositions given therein.

TABLE 35

| | Composition of Comparative Example [wt %] | | |
|---|---|---|---|
| Ingredient | nr 70 | nr 71 | nr 72 |
| PEDOT | 0.215 | 0.203 | 0.215 |
| PEDOT/PSS | 0.73 | 0.69 | 0.73 |
| PD | 89.4 | 85.2 | 81.4 |
| DEG | — | 0.95 | — |
| NMP | 0.93 | 0.88 | 9.04 |
| 3-glycidoxypropyltrimethoxysilane | 0.50 | 0.48 | 0.49 |
| CARBOPOL ® AQUA 30 | 6.66 | 6.35 | 6.58 |
| ZONYL ® FSO100 | 0.25 | 0.24 | 0.25 |
| X50860A | 0.05 | 0.05 | 0.05 |
| DISPERCOLL ® U VP KA 8481 | — | 3.81 | — |
| deionized water | 1.39 | 1.32 | 1.37 |

The non-pigmented pastes of COMPARATIVE EXAMPLES 70 to 72 were screen printed through a P79 mesh using a hand screen printing press onto BAYFOL® CR 1-4 and AUTOSTAT® CT7 supports and layers of LUXPRINT® 7138J and LUXPRINT™ 7153E and dried at 80° C. for 10 minutes for BAYFOL® CR 1-4, 120° C. for 2 minutes for AUTOSTAT® CT7 and 130° C. for 5 minutes for layers of LUXPRINT® 7138J and LUXPRINT™ 7153E. The print quality, adhesion, surface resistance and optical density were then evaluated as described for COMPARATIVE EXAMPLES 1 to 15.

The print quality results are given in Table 36, the surface resistance results in Table 37, the optical density measurements in Table 38 and the adhesion results in Table 39.

TABLE 36

| Comparative Example nr | Print on BAYFOL ® CR 1-4 | | |
|---|---|---|---|
| | mottle | pinholes | haze |
| 70 | 2 | 0 | — |
| 71 | 0 | 0 | 1 |
| 72 | 1 | 3 | 2 |

TABLE 37

| Comparative Example nr | Surface resistance [Ω/square] | | |
|---|---|---|---|
| | P79 layer on BAYFOL® CR 1-4 | P79 layer on AUTOSTAT® CT7 | P79 layer on LUXPRINT® 7138J layer |
| 70 | 2800 | 2800 | 3200 |
| 71 | 3200 | 3100 | 3300 |
| 72 | 2000 | 2350 | 3440 |

TABLE 38

| Comparative Example nr | P79 layer on AUTOSTAT® CT 7 | | | |
|---|---|---|---|---|
| | $d_{blue}$ | $d_{green}$ | $d_{red}$ | $d_{vis}$ |
| 70 | 0.02 | 0.03 | 0.03 | 0.02 |
| 71 | 0.02 | 0.02 | 0.03 | 0.03 |
| 72 | 0.02 | 0.02 | 0.03 | 0.01 |

TABLE 39

| Comparative Example nr | Adhesion according to TESAPACK® 4122 TEST | | | |
|---|---|---|---|---|
| | P79 layer on BAYFOL® CR 1-4 | P79 layer on AUTOSTAT® CR7 | P79 layer on LUXPRINT® 7138J layer | P79 layer on LUXPRINT® 7153E layer |
| 70 | 4 | 0 | 4 | 4 |
| 71 | 0 | 0 | 0 | 0 |
| 72 | 4 | 0 | 0 | 0 |

The results in Table 39 clearly show a higher adhesion with the print produced with the paste of COMPARATIVE EXAMPLE 71 with DISPERCOLL® U VP KA 8481 than with prints produced with the pastes of COMPARATIVE EXAMPLES 70 and 72 without DISPERCOLL® U VP KA 8481. This demonstrates the efficacious effect of DISPERCOLL® U VP KA 8481 on the adhesion of pastes, according to the present COMPARATIVE, on BAYFOL® CR 1-4.

COMPARATIVE EXAMPLE 73 TO 76

The composition of COMPARATIVE EXAMPLE 73 was prepared by first adding 54 kg of 1,2-propandiol and 6 kg of diethylene glycol to 40 kg of a conventional 1.2% by weight dispersion of PEDOT/PSS with a weight ratio of PEDOT to PSS of 1:2.4 in water and then evaporating water with stirring by distillation at 60° C. (heating element temperature) and a vacuum of 83 hPa (mbar) for 11 hours whereupon 39.75 kg of liquid had been removed and the residual water concentration was 2.7% by weight. The ingredients given in Table 40 for COMPARATIVE EXAMPLE 73 were then added with stirring to obtain the composition given therein.

The composition of COMPARATIVE EXAMPLE 73 was then used as the starting composition for preparing the compositions of COMPARATIVE EXAMPLE 74 to 76 by adding the appropriate quantities of DISPERCOLL® U VP KA 8481 to give the compositions given in Table 40.

TABLE 40

| Ingredient | Composition of Comparative Example [wt %] | | | |
|---|---|---|---|---|
| | nr 73 | nr 74 | nr 75 | nr 76 |
| PEDOT | 0.229 | 0.224 | 0.221 | 0.209 |
| PEDOT/PSS | 0.78 | 0.76 | 0.75 | 0.71 |
| PD | 80.9 | 79.3 | 77.7 | 73.4 |
| DEG | 9.35 | 9.17 | 8.99 | 8.50 |
| 3-glycidoxypropyltrimethoxysilane | 0.51 | 0.50 | 0.49 | 0.46 |
| CARBOPOL® AQUA 30 | 6.74 | 6.60 | 6.47 | 6.12 |
| ZONYL® FSO100 | 0.25 | 0.25 | 0.24 | 0.23 |
| X50860A | 0.05 | 0.05 | 0.05 | 0.05 |
| DISPERCOLL® U VP KA 8481 | — | 1.98 | 3.89 | 9.18 |
| deionized water | 1.40 | 1.38 | 1.35 | 1.27 |

The pastes of COMPARATIVE EXAMPLES 73 to 76 were screen printed through a P79 mesh using a hand screen printing press onto BAYFOL® CR 1-4 and AUTOSTAT® CT7 supports and layers of LUXPRINT® 7138J and LUXPRINT™ 7153E and dried at 80° C. for 10 minutes for BAYFOL® CR 1-4, 120° C. for 2 minutes for AUTOSTAT® CT7 and 130° C. for 5 minutes for layers of LUXPRINT® 7138J and LUXPRINT™ 7153E. The print quality, adhesion, surface resistance and optical density were then evaluated as described for COMPARATIVE EXAMPLES 1 to 15.

The print quality results on BAYFOL® CR 1-4 are given in Table 41, the surface resistance results on all the media in Table 42 and the optical density measurements of prints on BAYFOL® CR 1-4 and AUTOSTAT® CT7 in Table 43.

TABLE 41

| Comparative Example nr | Print on BAYFOL® CR 1-4 | | |
|---|---|---|---|
| | mottle | pinholes | haze |
| 73 | 0 | 0 | 1 |

TABLE 42

| Comparative Example nr | Surface resistance [Ω/square] of P79 layer | | | | |
|---|---|---|---|---|---|
| | on BAYFOL® CR 1-4 | | on AUTOSTAT® CR7 | on LUXPRINT® 7138J layer | on LUXPRINT® 7153E layer |
| | before stretch | after 100% stretching at 120° C. | | | |
| 73 | 740 | 10700 | 1050 | 1050 | 840 |
| 74 | 990 | 10800 | 840 | 840 | — |
| 75 | 1430 | 23000 | 1000 | 1000 | — |
| 76 | 1240 | 20100 | 960 | 960 | — |

TABLE 43

P79 layer on BAYFOL® CR 1–4

| Comparative Example nr | $d_{vis}$ before stretch | $d_{vis}$ after 100% stretching at 120° C. | P79 layer on AUTOSTAT® CR7 | | | |
|---|---|---|---|---|---|---|
| | | | $d_{blue}$ | $d_{green}$ | $d_{red}$ | $d_{vis}$ |
| 73 | 0.05 | 0.08 | 0.02 | 0.03 | 0.04 | 0.02 |
| 74 | 0.04 | 0.08 | 0.03 | 0.04 | 0.05 | 0.03 |
| 75 | 0.03 | 0.07 | 0.02 | 0.03 | 0.04 | 0.03 |
| 76 | 0.03 | 0.11 | 0.02 | 0.03 | 0.05 | 0.02 |

The adhesion measurements on all the media are given in Table 44.

TABLE 44

Adhesion according to TESAPACK® 4122 TEST on P79 layer

| Comparative Example nr | on BAYFOL® CR 1–4 before stretch | on BAYFOL® CR 1–4 after 100% stretching at 120° C. | on AUTOSTAT® CT7 | on LUXPRINT® 7138J layer | on LUXPRINT® 7153E layer |
|---|---|---|---|---|---|
| 73 | 4 | 5 | 1 | 0 | 0 |
| 74 | 0 | 0 | 0 | 0 | 0 |
| 75 | 0 | 0 | 0 | 0 | 0 |
| 76 | 0 | 0 | 0 | 0 | 0 |

The adhesion measurements of the prints on AUTOSTAT® CT7 and the layers of LUXPRINT® 7138J and LUXPRINT™ 7153E were excellent for all the pastes evaluated i.e. with or without DISPERCOLL® U VP KA 8481. However, with BAYFOL® CR 1-4 there was a significant improvement in adhesion with prints produced with the pastes of COMPARATIVE EXAMPLES 74 to 76 containing DISPERCOLL® U VP KA 8481 compared with prints produced with the paste of COMPARATIVE EXAMPLE 73 without DISPERCOLL® U VP KA 8481. Furthermore, this excellent adhesion on BAYFOL® CR 1-4 was maintained upon stretching the printed support by 100% at 120° C. in the cases of prints produced with pastes containing DISPERCOLL® U VP KA 8481, see Table 44. This stretching was accompanied by an increase in optical density from 0.02 to 0.03 to 0.07 to 0.11 and a 10- to 16-fold increase in surface resistance. This increase in resistance upon stretching was significantly lower in the case of prints produced with the paste of COMPARATIVE EXAMPLE 74 compared with prints produced with the pastes of COMPARATIVE EXAMPLES 75 and 76 indicating that an excess of DISPERCOLL® U VP KA 8481 over that required to realize good adhesion results in an increase in surface resistance of the resulting print which is much greater upon stretching.

COMPARATIVE EXAMPLE 77

The composition of COMPARATIVE EXAMPLE 77 was prepared by adding 239 g of n-butanol, 631 g of 1,2-propandiol and 69 g of diethylene glycol to 1635 g of a conventional 1.2% by weight dispersion of PEDOT/PSS with a weight ratio of PEDOT to PSS of 1:2.4 in water and then evaporating water in part as pure water and in part as an azeotropic mixture with n-butanol (42.8% by weight water and 57.2% by weight n-butanol with a boiling point at atmospheric pressure of 92.7° C. compared with 100° C. for water and 117° C. for n-butanol) with stirring by distillation at 60° C. (heat source temperature) and a vacuum of 30 hPa (mbar) for 16 hours whereupon 1793 g of liquid had been removed and a final PEDOT/PSS concentration of 2.5% by weight had been realized with a residual water content of 3.9% by weight as determined using the Karl Fisher method.

COMPARATIVE EXAMPLES 78 AND 79

The starting compositions for preparing the compositions of COMPARATIVE EXAMPLES 78 and 79 were prepared by first adding 34.56 kg of diethylene glycol to 230.4 kg of a conventional 1.2% by weight dispersion of PEDOT/PSS with a weight ratio of PEDOT to PSS of 1:2.4 in water to a 400 L vessel and then evaporating water with stirring by distillation at 88–89° C. using an oil bath at 110° C. for COMPARATIVE EXAMPLE 78 and at 55° C. using a water both at 60° C. for COMPARATIVE EXAMPLE 79 in both cases at a vacuum of 20 hPa (mbar), while simultaneously 311.04 kg of 1,2-propandiol were added at a rate of 31 kg per hour, until 242.9 kg of mainly water had evaporated and the concentration of water had been reduced to a concentration of 1.1% by weight and 8.4% by weight respectively. The compositions thereby obtained are given in Table 45.

TABLE 45

| | Starting composition for Comparative Example 78 [wt %] | Starting composition for Comparative Example 79 [wt %] |
|---|---|---|
| PEDOT/PSS | 0.82 | 0.73 |
| PD | 88.28 | 81.77 |
| DEG | 9.8 | 9.1 |
| deionized water | 1.1 | 8.4 |

These compositions were then used as the starting compositions for preparing the compositions of COMPARATIVE EXAMPLES 78 and 79 respectively by adding the appropriate quantities of the ingredients given in Table 46 to prepare 200 g of the compositions given therein.

TABLE 46

| | Composition of Comparative Example [wt %] | |
|---|---|---|
| Ingredient | nr 78 | nr 79 |
| PEDOT | 0.238 | 0.211 |
| PEDOT/PSS | 0.808 | 0.719 |
| PD | 86.956 | 80.543 |
| DEG | 9.653 | 8.964 |

TABLE 46-continued

| Ingredient | Composition of Comparative Example [wt %] | |
|---|---|---|
| | nr 78 | nr 79 |
| 3-glycidoxypropyltrimethoxysilane | 0.5 | 0.5 |
| ZONYL ® FSO100 | 0.5 | 0.5 |
| X50860A | 0.5 | 0.5 |
| deionized water | 1.084 | 8.274 |

The pastes of COMPARATIVE EXAMPLES 78 and 79 were screen printed through a P120 mesh using a hand screen printing press onto AUTOSTAT® CT7 supports and layers of LUXPRINT® 7138J and LUXPRINT™ 7153E and dried at 120° C. for 2 minutes for AUTOSTAT® CT7 and 130° C. for 5 minutes for layers of LUXPRINT® 7138J and LUXPRINT™ 7153E. The print quality, adhesion, surface resistance and optical density were then evaluated as described for COMPARATIVE EXAMPLES 1 to 15.

The print quality results, optical density measurements and surface resistance results for COMPARATIVE EXAMPLES 78 and 79 are given in Tables 47 and 48 respectively.

TABLE 47

| | Print quality | $D_{blue}$ | $D_{green}$ | $D_{red}$ | $D_{vis}$ | Surface resistance [Ω/square] | Adhesion |
|---|---|---|---|---|---|---|---|
| Autostat CT7 | mat | 0.02 | 0.02 | 0.03 | 0.02 | 13800 | 1 |
| Luxprint 7138J | — | — | — | — | — | 50000 | 0 |
| Luxprint 7153E | — | — | — | — | — | 34000 | 0 |

TABLE 48

| | Print quality | $D_{blue}$ | $D_{green}$ | $D_{red}$ | $D_{vis}$ | Surface resistance [Ω/square] | Adhesion |
|---|---|---|---|---|---|---|---|
| Autostat CT7 | slight mottle | 0.02 | 0.02 | 0.03 | 0.03 | 2170 | 0–1 |
| Luxprint 7138J | — | — | — | — | — | 5100 | 0–1 |
| Luxprint 7153E | — | — | — | — | — | 5300 | 0 |

The results in Tables 47 and 48 clearly show that prints obtained with the paste of COMPARATIVE EXAMPLE 47 prepared from a starting composition prepared by evaporation at 88–89° C. exhibited inferior coating quality and surface resistances to those obtained with the paste of COMPARATIVE EXAMPLE 48 with the same composition but prepared from a starting composition prepared by evaporation at 55° C.

INVENTION EXAMPLES 1 TO 4

The starting compositions of INVENTION EXAMPLES 1 to 4 were prepared by mixing the solvent given in Table 49 in the quantity also given in Table 49 to the quantity of improved 0.82% by weight aqueous dispersion of PEDOT/PSS with a weight ratio of PSS to PEDOT 2.4:1 given in Table 49 and evaporating with stirring from the resulting mixtures by distillation using a water bath at the temperature given in Table 49 and a vacuum of 50 hPa (mbar) giving the compositions also given in Table 49.

TABLE 49

| | mixture before dewatering | | | | (final) composition | | | |
|---|---|---|---|---|---|---|---|---|
| | non-aqueous solvent | | 0.82% PEDOT/PSS | Temperature of water | PEDOT/ | non-aqueous solvent | | |
| Invention example Nr | type | quantity [g] | dispersion in water | bath [° C.] | PSS [wt %] | type | quantity [wt %] | water [wt %] |
| 1 | BuOH PD DEG | 2335 900 98 | 2333 | 60 | 2.74 | PD + DEG | 93.06 | 4.2 |
| 2 | BuOH PD DEG | 2335 900 98 | 2333 | 70 | 3.10 | PD + DEG | 94.70 | 2.2 |
| 3 | PD DEG | 900 98 | 2333 | 60 | 2.88 | PD + DEG | 91.02 | 6.1 |
| 4 | PD DEG | 900 98 | 2333 | 70 | 3.00 | PD + DEG | 94.50 | 2.5 |

The content of PEDOT in these compositions, obtained by dividing the content of PEDOT/PSS by 3.4, varied between 0.806 and 0.912% by weight.

These starting compositions for INVENTION EXAMPLES 1 to 4 were themselves screen printed through the screen given in Table 50 onto AUTOSTAT™ CT07 supports using a manually operated press and the resulting prints dried for 130° C. for 2 minutes.

The surface resistance and optical density were then evaluated as described for COMPARATIVE EXAMPLES 1 to 15. The print quality was assessed as regards mottle as described for COMPARATIVE EXAMPLES 23 to 34 and as regards comets (print defects in which a point defect has a trail behind it like a comet) visually on a scale of 0 to 5, 0 corresponding to a good comet-free layer, according to the following criteria:

comet assessment of 0: no comets observed upon visual inspection;
comet assessment of 1: comets over between 0 and 1% of print;
comet assessment of 2: comets over between 1.1 and 5% of print;
comet assessment of 3: comets over between 5.1 and 10% of print;
comet assessment of 4: comets over between 10.1 and 15% of print;
comet assessment of 5: comets over more than 15% of the print.

The print quality results and optical density measurements and surface resistance results are given in Table 50.

TABLE 50

| | Starting composition for Invention Example nr | | | |
|---|---|---|---|---|
| | 1 | 2 | 3 | 4 |
| screen used | P34 | P34 | P34 | P34 |
| $D_{blue}$ | 0.29 | 0.32 | 0.29 | 0.29 |
| $D_{green}$ | 0.36 | 0.39 | 0.36 | 0.37 |
| $D_{red}$ | 0.47 | 0.52 | 0.48 | 0.49 |
| $D_{vis}$ | 0.30 | 0.34 | 0.31 | 0.31 |
| Mottle test | 3 | 3 | 3 | 3 |
| Comet test | 1 | 1 | 1 | 1 |
| Surface resistance [ohm/square] | 101 | 90 | 96 | 95 |

There was no significant difference in print properties for prints produced with starting materials produced by azeotropic evaporation of water with the water bath at 60° C. and those produced by azeotropic evaporation of water with the water bath at 70° C. Addition of alcohols, such as isopropanol or n-butanol, improved the print quality by reducing the mottle and presence of comets.

These starting compositions were then used for preparing the opaque compositions of INVENTION EXAMPLES 80 to 83 by adding the appropriate quantities of the ingredients given in Table 51, including the black pigment PIG07, to prepare 100 g of the compositions given therein.

TABLE 51

| | Composition of Invention Example [wt %] | | | |
|---|---|---|---|---|
| Ingredient | nr 1 | nr 2 | nr 3 | nr 4 |
| PEDOT | 0.733 | 0.830 | 0.771 | 0.803 |
| PEDOT/PSS | 2.494 | 2.822 | 2.622 | 2.731 |
| PD + DEG + BuOH | 88.546 | 88.218 | 88.418 | 88.309 |
| 3-glycidoxypropyltrimethoxysilane | 0.5 | 0.5 | 0.5 | 0.5 |
| ZONYL ® FSO100 | 0.25 | 0.25 | 0.25 | 0.25 |
| X50860A | 0.05 | 0.05 | 0.05 | 0.05 |
| binder 02 | 6.66 | 6.66 | 6.66 | 6.66 |
| PIG07 | 1.50 | 1.50 | 1.50 | 1.50 |

The opaque compositions of INVENTION EXAMPLES 1 to 4 were screen printed though the screen given in Table 51 using a manually operated screen press onto AUTOSTAT® CT7 supports and layers of LUXPRINT® 7138J and LUXPRINT™ 7153E and dried at 120° C. for 2 minutes for AUTOSTAT® CT7 and 130° C. for 5 minutes for layers of LUXPRINT® 7138J and LUXPRINT™ 7153E. The surface resistance and optical density and print quality was assessed as described above.

The print quality results and optical density measurements for prints on AUTOSTAT™ CT7 are given in Table 52 and the surface resistance results for prints on AUTOSTAT™ CT7, LUXPRINT 7138J and LUXPRINT™ 7153E are also given in Table 52.

TABLE 52

| | Opaque composition of Invention Example nr | | | |
|---|---|---|---|---|
| | 1 | 2 | 3 | 4 |
| screen used | P34 on Autostat ® CT7 | P34 | P34 | P34 |
| $D_{blue}$ | 1.57 | 1.52 | 1.28 | 1.42 |
| $D_{green}$ | 1.54 | 1.47 | 1.26 | 1.35 |
| $D_{red}$ | 1.52 | 1.45 | 1.25 | 1.37 |
| $D_{vis}$ | 1.54 | 1.46 | 1.26 | 1.39 |
| mottle test | 1 | 1 | 2 | 2 |
| comet test | 1 | 1 | 2 | 2 |
| Surface resistance in ohm/square | | | | |
| Autostat ® CT7 | 205 | 211 | 209 | 274 |
| Luxprint ® 7138J | 176 | 177 | 161 | 226 |
| Luxprint ® 7153E | 269 | 262 | 211 | 300 |

The print properties were satisfactory on all three surfaces evaluated.

INVENTION EXAMPLES 5 TO 16

The starting compositions of INVENTION EXAMPLES 5 to 16 were prepared by mixing the solvent given in Table 53 in the quantity also given in Table 53 to the quantity of improved 0.82% by weight aqueous dispersion of PEDOT/PSS with a weight ratio of PSS to PEDOT 2.4:1 given in Table 53 and evaporating with stirring from the resulting mixtures by distillation using a water bath at 60° C. and a vacuum of 50 hPa (mbar) giving the compositions also given in Table 53.

TABLE 53

| mixture before dewatering | | | (final) composition | | |
|---|---|---|---|---|---|
| non-aqueous solvent | | 0.82% PEDOT/ | PEDOT/ | non-aqueous solvent | |
| type | quantity [kg] | PSS dispersion in water [kg] | PSS [wt %] | type | quantity [wt. %] | water [wt %] |
| PD DEG | 9.765 1.085 | 44.310 | 3.0 | PD + DEG | 91.5 | 5.5 |

This starting compositions was used for preparing the opaque compositions of INVENTION EXAMPLES 5 to 16 by adding the appropriate quantities of the ingredients given in Table 54, including various black pigments, to prepare 100 g of the compositions given therein.

3-glycidoxypropyltrimethoxysilane (GOPTMS), ZONYL® FSO100 and X50860A were first added to the starting composition with stirring followed by the pigment and binder 23 with stirring, except in the cases of INVENTION EXAMPLES 10 and 11. In the case of the paste of INVENTION EXAMPLE 14 binder 22 was the final ingredient to be added with stirring.

The opaque compositions of INVENTION EXAMPLES 5 to 16 were all slightly viscous with the exception of INVENTION EXAMPLE 9, which was a little more viscous. These opaque compositions were all allowed to stand at least overnight before screen printing though the screen given in Table 55 using a manually operated screen press onto AUTOSTAT® CT7 supports and layers of LUX-PRINT® 7138J and LUXPRINT™ 7153E and dried at 130° C. for 2 minutes for AUTOSTAT® CT7 and 130° C. for 5 minutes for layers of LUXPRINT® 7138J and LUX-PRINT™ 7153E. The surface resistance and optical density and print quality was assessed as described above.

PEDOT/PSS-layer settled out and a precipitate was observed on the thermometer. The distillation of the azeotrope was resumed at a temperature of 92° C. for a further 200 minutes after which a total of 825 mL (723.8 g) of the azeotrope had distilled off. The distillate separated into an aqueous phase (130 mL) and an oil phase. 17.8 g of a deep

TABLE 54

| | Composition of Invention Example Nr [wt %] | | | | | | | | | | | |
|---|---|---|---|---|---|---|---|---|---|---|---|---|
| Ingredient | 5 | 6 | 7 | 8 | 9 | 10 | 11 | 12 | 13 | 14 | 15 | 16 |
| PEDOT | 0.76 | 0.74 | 0.74 | 0.76 | 0.77 | 0.78 | 0.77 | 0.77 | 0.77 | 0.75 | 0.74 | 0.73 |
| PEDOT/PSS | 2.66 | 2.60 | 2.60 | 2.66 | 2.69 | 2.73 | 2.69 | 2.69 | 2.69 | 2.63 | 2.60 | 2.55 |
| PD + DEG | 81.01 | 79.46 | 79.46 | 81.20 | 81.92 | 83.30 | 81.92 | 81.92 | 81.92 | 80.10 | 79.46 | 77.72 |
| GOPTMS* | 0.5 | 0.5 | 0.5 | 0.5 | 0.5 | 0.5 | 0.5 | 0.5 | 0.5 | 0.5 | 0.5 | 0.5 |
| ZONYL® FSO100 | 0.25 | 0.25 | 0.25 | 0.25 | 0.25 | 0.25 | 0.25 | 0.25 | 0.25 | 0.25 | 0.25 | 0.25 |
| X50860A | 0.05 | 0.05 | 0.05 | 0.05 | 0.05 | 0.05 | 0.05 | 0.05 | 0.05 | 0.05 | 0.05 | 0.05 |
| binder 02 | 6.66 | 6.66 | 6.66 | 6.66 | 6.66 | 6.66 | 6.66 | 6.66 | 6.66 | 6.66 | 6.66 | 6.66 |
| binder 22 | — | — | — | — | — | — | — | — | — | 2.0 | — | — |
| PIG07 | — | — | — | — | — | 1.5 | 3.0 | 3.0 | 3.0 | 3.0 | — | — |
| PIG10 | 4.0 | — | — | — | — | — | — | — | — | — | — | — |
| PIG11 | — | 5.7 | — | — | — | — | — | — | — | — | — | — |
| PIG12 | — | — | 5.7 | — | — | — | — | — | — | — | — | — |
| PIG13 | — | — | — | 3.8 | — | — | — | — | — | — | — | — |
| PIG14 | — | — | — | — | 3.0 | — | — | — | — | — | — | — |
| PIG15 | — | — | — | — | — | — | — | — | — | — | 5.7 | — |
| PIG16 | — | — | — | — | — | — | — | — | — | — | — | 7.6 |
| deionized water | 4.87 | 4.78 | 4.78 | 4.88 | 4.93 | 5.01 | 4.93 | 4.93 | 4.93 | 4.81 | 4.78 | 4.67 |

*3-glycidoxypropyltri-methoxy-silane

The print quality results and optical density measurements for prints on AUTOSTAT™ CT7 are given in Table 55 and the surface resistance results for prints on AUTOSTAT™ CT7, LUXPRINT 7138J and LUXPRINT™ 7153E are also given in Table 55.

blue-black residue containing 1.8 g of PEDOT/PSS-latex and 16 g of water was recovered by washing with ethanol, filtered off and dried and was found to have a rubbery consistency. This residue readily redispersed in water after 5 minutes in an ultrasonic bath.

TABLE 55

| | Opaque composition of Invention Example nr | | | | | | | | | | | |
|---|---|---|---|---|---|---|---|---|---|---|---|---|
| | 5 | 6 | 7 | 8 | 9 | 10 | 11 | 12 | 13 | 14 | 15 | 16 |
| screen used | P34 | P34 | P34 | P34 | P34 on Autostat® CT7 | P34 | P34 | P34 | P34 | P34 | P34 | P34 |
| $D_{blue}$ | 0.70 | 1.71 | 2.03 | 0.36 | 2.84 | 0.98 | 1.65 | 1.87 | 2.22 | 2.20 | 2.85 | 0.94 |
| $D_{green}$ | 0.75 | 1.66 | 1.97 | 0.43 | 2.71 | 0.99 | 1.62 | 1.85 | 2.16 | 2.04 | 2.64 | 0.94 |
| $D_{red}$ | 0.83 | 1.64 | 1.88 | 0.52 | 2.62 | 1.05 | 1.62 | 1.87 | 2.16 | 2.01 | 2.57 | 0.98 |
| $D_{vis}$ | 0.71 | 1.67 | 1.97 | 0.38 | 2.77 | 0.97 | 1.62 | 1.85 | 2.18 | 2.07 | 2.77 | 0.93 |
| mottle test | 3 | 3–4 | 3 | 3 | 0 | 3 | 2 | 1 | 1 | 3 | 0 | 4 |
| comet test | 2 | 1–2 | 2–3 | 0–1 | 1 | 1 | 2–3 | 1 | 1 | 4 | 0–1 | 1–2 |
| | Surface resistance in ohm/square | | | | | | | | | | | |
| Autostat® CT7 | 98 | 106 | 115 | 100 | 91 | 94 | 94 | 94 | 84 | 113 | 114 | 121 |
| Luxprint® 7138J | — | 104 | 99 | — | 89 | 88 | 83 | 86 | 77 | 94 | 104 | — |
| Luxprint® 7153E | — | 114 | 124 | — | 92 | 95 | 104 | 98 | 89 | 108 | 113 | — |

The print properties were satisfactory on all three surfaces evaluated.

COMPARATIVE EXAMPLE 80

EXAMPLE 80 of WO 02/042352 was repeated by first polymerizing EDOT in the presence of PSS as disclosed in EP-A-0 440 957, 150 g of the resulting dispersion mixed with 600 g (690 mL) of toluene forming an oil in water emulsion and 260 mL of the water/toluene azeotrope distilled off at 90° C., using an oil bath whose temperature did not exceed 135° C., over a period of 2 hours. Overnight the

COMPARATIVE EXAMPLE 81

Preparation of Screen Printing Inks with a Powder Prepared by Freeze-drying an Aqueous PEDOT/PSS-dispersion as Disclosed in SAMPLES XVII to XXIII of WO 02/00759

SAMPLES XVII to XXIII of WO 02/00759 were prepared by adding different solvents optionally together with CARBOPOL™ ETD2623 to a powder prepared by freeze-drying a 1.2% by weight aqueous dispersion of PEDOT/PSS with a weight ratio PEDOT:PSS of 1:2.46 under high vacuum (0.7 hPa (mbar)) in a CHRIST BETA2-16 shelf freeze-dryer until all of the water was evaporated (i.e. until the temperature of the shelves was equal to room temperature), predispersing with an ULTRA-TURRAX™ followed by prolonged ball milling [for duration see Table 56 (=Table 8 of WO 02/00759)] so as to obtain samples XVII to XXIII with the compositions given in Table 56 (=Table 8 of WO 02/00759).

TABLE 56

(=Table 8 of WO 02/00759):

| Sample | ball milling duration [h] | PEDOT/ PSSA [wt. %] | water [wt. %] | solvent medium | [wt. %] | CARBOPOL ETD 2623 [wt. %] |
|---|---|---|---|---|---|---|
| XVII | 24 | 1.19 | 0.31 | diethylene glycol/ carbitol-acetate 4/1 | 98.5 | — |
| XVIII | 48 | 1.58 | 0.42 | diethylene glycol | 96.0 | 2 |
| XIX | 48 | 1.58 | 0.42 | N-methyl-pyrrolidone | 96.0 | 2 |
| XX | 48 | 1.58 | 0.42 | isopropanol | 96.0 | 2 |
| XXII | 96 | 1.98 | 0.52 | n-propanol | 97.5 | — |
| XXIII | 24 | 1.24 | 0.31 | diethylene glycol | 98.45 | — |

Such high energy dispersion techniques are disadvantageous compared with the process, according to the present invention, which realizes exchange of water for an organic medium without the expenditure of such high energy over such long periods.

Samples XVII to XXIII obtained as a result of redispersing the freeze-dried powder are characterized in Table 57 (=Table 9 of WO 02/00759).

TABLE 57

(=Table 9 of WO 02/00759):

| Sample | dispersion characteristics |
|---|---|
| XVII | viscous and flocked |
| XVIII | very thick dispersion |
| XIX | very thick dispersion |
| XX | very thick dispersion |
| XXII | strongly flocked |
| XXIII | homogeneous flowing dispersion |

The complex viscosity η* of Sample XXIII was determined with a AR1000 cone and plate Rheometer at 25° C. and frequencies of 10, 1 and 0.1 Hz to be 1000 Pa.s, 5000 Pa.s and 40,000 Pa.s respectively.

Screen printing was carried out with Sample XXIII with a P59 screen on a subbed polyethylene terephthalate support. The surface resistance of the resulting prints was determined by cutting a strip having a length of 27.5 cm and a width of 35 mm, applying electrodes of a conductive polymer, ECCOCOAT CC-2, over the width of the strip a distance of 10 cm apart, applying a constant potential between the electrodes, measuring the current flowing through the circuit with a Pico-amperemeter KEITHLEY 485 and calculating the surface resistivity in Ω/square from the potential and the current, taking into account the geometry of the area between the electrodes. The optical density of the print was measured with a MACBETH™ T924 densitometer through a visible filter. The results are given in Table 58 (=Table 10 of WO 02/00759).

TABLE 58

(=Table 10 of WO 02/00759):

| Sample | mesh used in screen printing | Surface resistivity [Ω/square] | Optical density [visible filter] |
|---|---|---|---|
| XXIII | P59 | 370 | 0.11 |

COMPARATIVE EXAMPLE 82

The composition of COMPARATIVE EXAMPLE 82 was prepared by adding 570 g of ethylene glycol to 430 g of a conventional 1.2% by weight dispersion of PEDOT/PSS with a weight ratio of PEDOT to PSS of 1:2.46 in water and then evaporating the resulting mixtures in a rotary evaporator at 60° C. and a vacuum of 50 hPa (mbar) giving the composition in Table 59.

The particle size of the PEDOT/PSS-latex in the solvent-exchanged dispersion was determined as described for COMPARATIVE EXAMPLES 1 to 15 and the results given in Table 59. Viscosity measurements were carried out with an AR1000 plate and cone rheometer at 25° C. with a cone with an angle of 2° and a plate 4 cm in diameter with increasing shear rate from 0.1 to 1000 $s^{-1}$, viscosities are given in Table 59 for shear rates of 1 $s^{-1}$ and 25 $s^{-1}$. A shear rate of 25 $s^{-1}$ approximately corresponds to the shear rate realized with a Brookfield viscometer with a #2 spindle.

TABLE 59

| | INVENTION EXAMPLE 96 |
|---|---|
| wt % PEDOT | 0.29 |
| wt % PEDOT/PSS determined by drying for 4 h at 150° C. | 1.00 |
| wt. % ethylene glycol | 95.6 |
| wt % deionized water as determined by Karl-Fischer method | 3.4 |
| Weight averaged mean particle size [nm] | 183* |
| viscosity at 25° C. and 1 $s^{-1}$ | 12.56 Pa · s |
| viscosity at 25° C. and 25 $s^{-1}$ | 1.399 Pa · s |

*bimodal distribution with peaks at 91.8 nm and 247.7 nm

The composition of COMPARATIVE EXAMPLE 82 was too viscous to filter and was spin-coated onto a glass plate by spinning for 1 s at 2000 rpm and then 50 s at 4000 rpm followed by drying for 30 minutes at 25° C. followed by 5 minutes at 85° C. Further layers were coated on the spin-coated layer following the same procedure. The layers obtained by 1, 2 and 3 spin-coatings were characterized as described for COMPARATIVE EXAMPLES 1 to 10 and the results obtained are given in Table 60. The frequency of aggregates was assessed by pipetting 0.1 g of the solvent-exchanged dispersion taken from the centre of the pot onto a A5-size sheet of AUTOSTAT™ CT7 and then placing an A5-size sheet of AUTOSTAT™ CT7 on top and visually inspecting the dispersion on a scale of 1 to 3, according to the following criteria:

| | |
|---|---|
| aggregate assessment of 0: | no aggregates observed; |
| aggregate assessment of 1: | 1 to 2 aggregates; |
| aggregate assessment of 2: | 3 to 5 aggregates observed; |
| aggregate assessment of 3: | more than 5 aggregates observed. |

Stark trap was replaced with a conventional distillation set-up using a condenser to improve the rate of distillation. The conventional PEDOT/PSS dispersion used in COMPARATIVE EXAMPLES 83 and 84 came from the same batch as that used in preparing the composition of COMPARATIVE EXAMPLE 82 and BAYTRON™ P obtained from BAYER was used for preparing the composition of COMPARATIVE EXAMPLE 85.

The resulting dispersions all exhibited thixotropy and were filtered through a 8 μm Millipore microfilter leaving little residue behind. The composition and concentration of the resulting dispersions are summarized in Table 61. All the dispersions exhibited pronounced flocking.

The particle size of the PEDOT/PSS-latex in the solvent-exchanged dispersion was determined as described for INVENTION EXAMPLES 1 to 15 and the results given in Table 61. Viscosity measurements were carried out with an AR1000 plate and cone rheometer at 25° C. with a cone with an angle of 2° and a plate 4 cm in diameter with increasing shear rate from 0.1 to 1000 s$^{-1}$, viscosities are given in Table 61 for shear rates of 1 s$^{-1}$ and 25 s$^{-1}$. A shear rate of 25 s$^{-1}$ approximately corresponds to the shear rate realized with a Brookfield viscometer with a #2 spindle.

TABLE 60

| number of spin-coated layers | layer thickness [nm] | aggregate assessment | surface resistance [Ω/square] | layer conductivity [S/cm] | optical density | | | |
|---|---|---|---|---|---|---|---|---|
| | | | | | $D_{blue}$ | $D_{green}$ | $D_{red}$ | $D_{vis}$ |
| 1 | 66.7 | 0 | 2347 | 64 | 0.01 | 0.02 | 0.02 | 0.02 |
| 2 | 105.7 | 0 | 953 | 99 | 0.02 | 0.03 | 0.04 | 0.03 |
| 3 | 149.3 | 0–1 | 566 | 118 | 0.03 | 0.05 | 0.06 | 0.05 |

COMPARATIVE EXAMPLES 83 TO 85

The starting materials for the pastes of COMPARATIVE EXAMPLES 83 to 85 were prepared according to the process disclosed in WO 02/067273. A 500 mL in a 3-neck flask was filled with 100 mL of ethylene glycol which was heated to 120° C. on an oil bath and stirred with an ULTRA-TURRAX stirrer at 2000 rpm. 76 mL of a conventional 1.2% by weight dispersion of PEDOT/PSS with a weight ratio of PEDOT to PSS of 1:2.46 in water was added with a perfusor pump at a rate of 1 mL/min while flushing continuously with nitrogen. Much of the water evaporated escaped via the shaft of the ULTRA-TURRAX stirrer. After 3 hours the mixture was cooled to room temperature. In COMPARATIVE EXAMPLE 83 a Dean Stark trap was used and in COMPARATIVE EXAMPLES 84 and 85 the Dean

TABLE 61

| Comparative Example nr | PEDOT/ PSS* [wt %] | quantity of water as determined by Karl-Fischer method [wt %] | ethylene glycol [wt %] | particle size distribution | | viscosity# at 25° C. [Pa · s] | |
|---|---|---|---|---|---|---|---|
| | | | | weight averaged mean nm | half-width [nm] | at 1 s$^{-1}$ | at 25 s$^{-1}$ |
| 83 | 0.81 | 15.3 | 83.89 | 77.7 | 55.6 | 0.515 | 0.192 |
| 84 | 0.8 | 13.6 | 85.6 | 78.5 | 76.4 | 0.559 | 0.205 |
| 85 | 1.0 | 10.05 | 88.95 | 96.1 | 59.5 | 0.660 | 0.223 |

*determined by drying for 4 h at 150° C.
determined with a cone-plate viscometer with a 2° cone and a plate 6 cm in diameter The weight-averaged mean particle size increased with decreasing water content and increasing viscosity.

The compositions of COMPARATIVE EXAMPLES 83 to 85 were then spin-coated onto a glass plate by spinning for 6 s at 800 rpm and then 50 s at 1500 rpm followed by drying for 30 minutes at 25° C. followed by 5 minutes at 85° C. Further layers were coated on the spin-coated layer following the same procedure. The layers obtained by 1, 2 and 3 spin-coatings were characterized as described for INVENTION EXAMPLES 1 to 10 and the results obtained are given in Table 62.

TABLE 62

| Comparative Example nr | number of spin-coated layers | layer thickness [nm] | aggregate assessment | surface resistance [Ω/square] | layer conductivity [S/cm] | optical density | | | |
|---|---|---|---|---|---|---|---|---|---|
| | | | | | | $D_{blue}$ | $D_{green}$ | $D_{red}$ | $D_{vis}$ |
| 83 | 1 | 92.4 | 1 | 1348 | 80 | 0.01 | 0.02 | 0.03 | 0.02 |
| | 2 | 242.8 | 2 | 614 | 67 | 0.02 | 0.03 | 0.05 | 0.04 |
| | 3 | — | — | — | — | too heterogeneous | | | |
| 84 | 1 | 100.2 | 1 | 1448 | 69 | 0.01 | 0.02 | 0.02 | 0.02 |
| | 2 | 190.8 | 2 | 669 | 78 | 0.02 | 0.03 | 0.04 | 0.03 |
| | 3 | — | — | — | — | too heterogeneous | | | |
| 85 | 1 | 81.0 | 1 | 3462 | 36 | 0.01 | 0.02 | 0.02 | 0.02 |
| | 2 | 170 | 2–3 | 1702 | 35 | 0.02 | 0.03 | 0.04 | 0.03 |
| | 3 | — | 2–3 | — | — | 0.03 | 0.05 | 0.07 | 0.06 |

The degree aggregation in the layers spin-coated using the compositions of COMPARATIVE EXAMPLES 83 to 85 was significantly greater than in the case of the layers spin-coated using the composition of COMPARATIVE EXAMPLE 82 prepared using the same liquid and the process according to the present invention, despite the fact that the composition of COMPARATIVE EXAMPLE 82 was not filtered prior to spin-coating.

The higher degree of PEDOT/PSS-aggregation in the compositions of COMPARATIVE EXAMPLES 83 to 85 was also reflected in the much poorer quality of the layer produced therewith than in the case of the composition of COMPARATIVE EXAMPLE 82, as reflected by its not being possible to measure the surface resistance of layers prepared by 3 spin-coatings.

Furthermore, the conductivities of the layers prepared by 2 spin-coatings with the compositions of COMPARATIVE EXAMPLES 83 and 84 produced with the same aqueous PEDOT/PSS-dispersion as used for preparing the composition of COMPARATIVE EXAMPLE 82 were significantly inferior to that produced with the composition of COMPARATIVE EXAMPLE 82.

These results show the superiority of the process for solvent replacement, according to the present invention, compared with the flash-distillation method disclosed in WO 02/067273.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

Having described in detail preferred embodiments of the current invention, it will now be apparent to those skilled in the art that numerous modifications can be made therein without departing from the scope of the invention as defined in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A coating composition, capable of yielding layers with enhanced conductivity at a given transparency, prepared according to a method for preparing a composition containing between 0.08 and 3.0% by weight of a polymer or copolymer of a 3,4-dialkoxythiophene in which said two alkoxy groups may be the same or different or together represent an optionally substituted oxy-alkylene-oxy bridge, a polyanion and at least one non-aqueous solvent from a dispersion of said polymer or copolymer of(3,4-dialkoxyrhiophene) and said polyanion in water which is prepared under an inert gas, comprising in the following order the steps of: i) mixing at least one of said non-aqueous solvents with said aqueous dispersion of said polymer or copolymer of (3,4-dialkoxythiophene) and said polyanion; and ii) evaporating water from the mixture prepared in step i) until the content of water therein is reduced by at least 65% by weight.

2. Coating composition according to claim 1, wherein the water in said mixture from step i) is reduced by at least 80% by weight.

3. Coating composition according to claim 1, wherein the water in said mixture from step i) is reduced by at least 90% by weight.

4. Coating composition according to claim 1, wherein the water in said mixture from step i) is reduced by at least 95% by weight.

5. Coating composition according to claim 1, wherein a dye or pigment is added in a further process step.

6. Coating composition according to claim 1, wherein said polymer or copolymer of a (3,4-dialkoxythiophene) is selected from the group consisting of: poly(3,4-methylene-dioxy-thiophene), poly(3,4-methylenedioxythiophene) derivatives, poly(3,4-ethylenedioxythiophene), poly(3,4-ethylenedioxy-thiophene) derivatives, poly[3,4-(propylene-dioxy)thiophene], poly[3,4-(propylenedioxy)thiophene] derivatives, poly(3,4-butylenedioxythiophene), poly(3,4-butylenedioxythiophene) derivatives and copolymers therewith.

7. Coating composition according to claim 1, wherein said polyanion is poly(styrene sulphonate).

8. Coating composition according to claim 1, wherein said at least one non-aqueous solvent is selected from the group consisting of alcohols, ketones, arenes, esters, ethers and their mixtures.

9. A printing ink or paste, capable of yielding layers with enhanced conductivity at a given transparency, prepared according to a method for preparing a composition containing between 0.08 and 3.0% by weight of a polymer or copolymer of a 3,4-dialkoxythiophene in which said two alkoxy groups may be the same or different or together represent an optionally substituted oxy-alkylene-oxy bridge, a polyanion and at least one non-aqueous solvent from a dispersion of said polymer or copolymer of(3,4-dialkox-ythiophene) and said polyanion in water which is prepared under an inert gas, comprising in the following order the steps of: i) mixing at least one of said non-aqueous solvents with said aqueous dispersion of said polymer or copolymer of(3,4-dialkoxyrhiophene) and said polyanion; and ii) evaporating water from the mixture prepared in step i) until the content of water therein is reduced by at least 65% by weight.

10. Printing ink according to claim 9, wherein said printing ink is a lithographic printing ink, a gravure printing ink, a flexographic printing ink, a screen printing ink, an ink-jet printing ink or an offset printing ink.

11. Printing ink according to claim 9, wherein the water in said mixture from step i) is reduced by at least 80% by weight.

12. Printing ink according to claim 9, wherein the water in said mixture from step i) is reduced by at least 90% by weight.

13. Printing ink according to claim 9, wherein the water in said mixture from step i) is reduced by at least 95% by weight.

14. Printing ink according to claim 9, wherein a dye or pigment is added in a further process step.

15. Printing ink according to claim 9, wherein said polymer or copolymer of a (3,4-dialkoxythiophene) is selected from the group consisting of: poly(3,4-methylene-dioxy-thiophene), poly(3,4-methylenedioxythiophene) derivatives, poly(3,4-ethylenedioxythiophene), poly(3,4-ethylenedioxy-thiophene) derivatives, poly[3,4-(propylene-dioxy)thiophene], poly[3,4-(propylenedioxy)thiophene] derivatives, poly(3,4-butylenedioxythiophene), poly(3,4-butylenedioxythiophene) derivatives and copolymers therewith.

16. Printing ink according to claim 9, wherein said polyanion is poly(styrene sulphonate).

17. Printing ink according to claim 9, wherein said at least one non-aqueous solvent is selected from the group consisting of alcohols, ketones, arenes, esters, ethers and their mixtures.

* * * * *